US012659719B2

(12) United States Patent　(10) Patent No.: US 12,659,719 B2
Lu　(45) Date of Patent: Jun. 16, 2026

(54) DYNAMICALLY ASSOCIATING MOBILE DEVICES WITH DIFFERENT LOGICAL NETWORKS IMPLEMENTED ON A SHARED NETWORK FABRIC OF A SINGLE ENTITY

(71) Applicant: VMware LLC, Palo Alto, CA (US)

(72) Inventor: Guang Lu, Beijing (CN)

(73) Assignee: VMware LLC, Palo Alto, CA (US)

( * ) Notice: Subject to any disclaimer, the term of this patent is extended or adjusted under 35 U.S.C. 154(b) by 383 days.

(21) Appl. No.: 18/208,358

(22) Filed: Jun. 12, 2023

(65) Prior Publication Data

US 2024/0414520 A1　Dec. 12, 2024

(51) Int. Cl.
*H04W 8/18* (2009.01)
*H04L 69/22* (2022.01)
*H04W 12/37* (2021.01)
*H04W 76/12* (2018.01)
*H04W 92/02* (2009.01)

(52) U.S. Cl.
CPC ............. *H04W 8/186* (2013.01); *H04L 69/22* (2013.01); *H04W 12/37* (2021.01); *H04W 76/12* (2018.02); *H04L 2212/00* (2013.01); *H04W 92/02* (2013.01)

(58) Field of Classification Search
CPC ..... H04W 8/186; H04W 12/37; H04W 76/12; H04W 92/02; H04L 69/22; H04L 2212/00; H04L 12/4633
See application file for complete search history.

(56) References Cited

U.S. PATENT DOCUMENTS 5,652,751 A　7/1997　Sharony
5,909,553 A　6/1999　Campbell et al.
(Continued)

FOREIGN PATENT DOCUMENTS

CN　1926809 A　3/2007
CN　102577270 A　7/2012
(Continued)

OTHER PUBLICATIONS

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
(Continued)

*Primary Examiner* — Eunsook Choi

(74) *Attorney, Agent, or Firm* — Kim & Stewart LLP

(57) ABSTRACT

Some embodiments provide a novel method for dynamically associating mobile devices with different logical networks implemented on an entity's shared network fabric. At least two logical networks are implemented for at least two entity groups. At a first site, the method authenticates a mobile device and uses mobile device management (MDM) servers to identify an MDM group associated with the mobile device. The method uses the MDM group (1) to identify a first logical network over a shared network fabric at the first site to connect the mobile device to resources of the first site, and (2) to identify a logical network identifier (LNI) of a second logical network connecting a first edge gateway at the first site to a second edge gateway at a second site. The method inserts the LNI in an encapsulation header of data messages sent from the mobile device to resources at the second site.

20 Claims, 15 Drawing Sheets

(56)　　　　References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,962,458 | B2 | 6/2011 | Holenstein et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin, III et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Xu |
| 9,419,878 | B2 | 8/2016 | Asiao et al. |
| 9,432,245 | B1 | 8/2016 | Sorenson, III et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |
| 10,187,289 | B1 | 1/2019 | Chen et al. |
| 10,200,264 | B2 | 2/2019 | Menon et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |
| 10,574,482 | B2 | 2/2020 | Oré et al. |
| 10,574,528 | B2 | 2/2020 | Mayya et al. |
| 10,594,516 | B2 | 3/2020 | Cidon et al. |
| 10,594,591 | B2 | 3/2020 | Houjyo et al. |
| 10,594,659 | B2 | 3/2020 | El-Moussa et al. |
| 10,608,844 | B2 | 3/2020 | Cidon et al. |
| 10,630,505 | B2 | 4/2020 | Rubenstein et al. |
| 10,637,889 | B2 | 4/2020 | Ermagan et al. |
| 10,666,460 | B2 | 5/2020 | Cidon et al. |
| 10,666,497 | B2 | 5/2020 | Tahhan et al. |
| 10,686,625 | B2 | 6/2020 | Cidon et al. |
| 10,693,739 | B1 | 6/2020 | Naseri et al. |
| 10,708,144 | B2 | 7/2020 | Mohan et al. |
| 10,715,427 | B2 | 7/2020 | Raj et al. |
| 10,749,711 | B2 | 8/2020 | Mukundan et al. |
| 10,778,466 | B2 | 9/2020 | Cidon et al. |

(56) References Cited

U.S. PATENT DOCUMENTS

| | | | |
|---|---|---|---|
| 10,778,528 | B2 | 9/2020 | Mayya et al. |
| 10,778,557 | B2 | 9/2020 | Ganichev et al. |
| 10,805,114 | B2 | 10/2020 | Cidon et al. |
| 10,805,272 | B2 | 10/2020 | Mayya et al. |
| 10,819,564 | B2 | 10/2020 | Turabi et al. |
| 10,826,775 | B1 | 11/2020 | Moreno et al. |
| 10,841,131 | B2 | 11/2020 | Cidon et al. |
| 10,911,374 | B1 | 2/2021 | Kumar et al. |
| 10,938,693 | B2 | 3/2021 | Mayya et al. |
| 10,951,529 | B2 | 3/2021 | Duan et al. |
| 10,958,479 | B2 | 3/2021 | Cidon et al. |
| 10,959,098 | B2 | 3/2021 | Cidon et al. |
| 10,992,558 | B1 | 4/2021 | Silva et al. |
| 10,992,568 | B2 | 4/2021 | Michael et al. |
| 10,999,100 | B2 | 5/2021 | Cidon et al. |
| 10,999,137 | B2 | 5/2021 | Cidon et al. |
| 10,999,165 | B2 | 5/2021 | Cidon et al. |
| 10,999,197 | B2 | 5/2021 | Hooda et al. |
| 11,005,684 | B2 | 5/2021 | Cidon |
| 11,018,995 | B2 | 5/2021 | Cidon et al. |
| 11,044,190 | B2 | 6/2021 | Ramaswamy et al. |
| 11,050,588 | B2 | 6/2021 | Mayya et al. |
| 11,050,644 | B2 | 6/2021 | Hegde et al. |
| 11,071,005 | B2 | 7/2021 | Shen et al. |
| 11,089,111 | B2 | 8/2021 | Markuze et al. |
| 11,095,612 | B1 | 8/2021 | Oswal et al. |
| 11,102,032 | B2 | 8/2021 | Cidon et al. |
| 11,108,595 | B2 | 8/2021 | Knutsen et al. |
| 11,108,851 | B1 | 8/2021 | Kurmala et al. |
| 11,115,347 | B2 | 9/2021 | Gupta et al. |
| 11,115,426 | B1 | 9/2021 | Pazhyannur et al. |
| 11,115,480 | B2 | 9/2021 | Markuze et al. |
| 11,121,962 | B2 | 9/2021 | Michael et al. |
| 11,121,985 | B2 | 9/2021 | Cidon et al. |
| 11,128,492 | B2 | 9/2021 | Sethi et al. |
| 11,146,632 | B2 | 10/2021 | Rubenstein |
| 11,153,230 | B2 | 10/2021 | Cidon et al. |
| 11,171,885 | B2 | 11/2021 | Cidon et al. |
| 11,212,140 | B2 | 12/2021 | Mukundan et al. |
| 11,212,238 | B2 | 12/2021 | Cidon et al. |
| 11,223,514 | B2 | 1/2022 | Mayya et al. |
| 11,245,641 | B2 | 2/2022 | Ramaswamy et al. |
| 11,252,079 | B2 | 2/2022 | Michael et al. |
| 11,252,105 | B2 | 2/2022 | Cidon et al. |
| 11,252,106 | B2 | 2/2022 | Cidon et al. |
| 11,258,728 | B2 | 2/2022 | Cidon et al. |
| 11,303,633 | B1 * | 4/2022 | Williams .............. H04L 63/083 |
| 11,310,170 | B2 | 4/2022 | Cidon et al. |
| 11,323,307 | B2 | 5/2022 | Mayya et al. |
| 11,349,722 | B2 | 5/2022 | Mayya et al. |
| 11,363,124 | B2 | 6/2022 | Markuze et al. |
| 11,374,904 | B2 | 6/2022 | Mayya et al. |
| 11,375,005 | B1 | 6/2022 | Rolando et al. |
| 11,381,474 | B1 | 7/2022 | Kumar et al. |
| 11,381,499 | B1 | 7/2022 | Ramaswamy et al. |
| 11,388,086 | B1 | 7/2022 | Ramaswamy et al. |
| 11,394,640 | B2 | 7/2022 | Ramaswamy et al. |
| 11,418,997 | B2 | 8/2022 | Devadoss et al. |
| 11,438,789 | B2 | 9/2022 | Devadoss et al. |
| 11,444,865 | B2 | 9/2022 | Ramaswamy et al. |
| 11,444,872 | B2 | 9/2022 | Mayya et al. |
| 11,477,127 | B2 | 10/2022 | Ramaswamy et al. |
| 11,489,720 | B1 | 11/2022 | Kempanna et al. |
| 11,489,783 | B2 | 11/2022 | Ramaswamy et al. |
| 11,509,571 | B1 | 11/2022 | Ramaswamy et al. |
| 11,516,049 | B2 | 11/2022 | Cidon et al. |
| 11,522,780 | B1 | 12/2022 | Wallace et al. |
| 11,526,434 | B1 | 12/2022 | Brooker et al. |
| 11,533,248 | B2 | 12/2022 | Mayya et al. |
| 11,552,874 | B1 | 1/2023 | Pragada et al. |
| 11,575,591 | B2 | 2/2023 | Ramaswamy et al. |
| 11,575,600 | B2 | 2/2023 | Markuze et al. |
| 11,582,144 | B2 | 2/2023 | Ramaswamy et al. |
| 11,582,298 | B2 | 2/2023 | Hood et al. |
| 11,601,356 | B2 | 3/2023 | Gandhi et al. |
| 11,606,225 | B2 | 3/2023 | Cidon et al. |
| 11,606,286 | B2 | 3/2023 | Michael et al. |
| 11,606,314 | B2 | 3/2023 | Cidon et al. |
| 11,606,712 | B2 | 3/2023 | Devadoss et al. |
| 11,611,507 | B2 | 3/2023 | Ramaswamy et al. |
| 11,637,768 | B2 | 4/2023 | Ramaswamy et al. |
| 11,677,720 | B2 | 6/2023 | Mayya et al. |
| 11,689,959 | B2 | 6/2023 | Devadoss et al. |
| 11,700,196 | B2 | 7/2023 | Michael et al. |
| 11,706,126 | B2 | 7/2023 | Silva et al. |
| 11,706,127 | B2 | 7/2023 | Michael et al. |
| 11,709,710 | B2 | 7/2023 | Markuze et al. |
| 11,716,286 | B2 | 8/2023 | Ramaswamy et al. |
| 11,722,925 | B2 | 8/2023 | Devadoss et al. |
| 11,729,065 | B2 | 8/2023 | Ramaswamy et al. |
| 2002/0049687 | A1 | 4/2002 | Helsper et al. |
| 2002/0075542 | A1 | 6/2002 | Kumar et al. |
| 2002/0085488 | A1 | 7/2002 | Kobayashi |
| 2002/0087716 | A1 | 7/2002 | Mustafa |
| 2002/0152306 | A1 | 10/2002 | Tuck |
| 2002/0186682 | A1 | 12/2002 | Kawano et al. |
| 2002/0198840 | A1 | 12/2002 | Banka et al. |
| 2003/0050061 | A1 | 3/2003 | Wu et al. |
| 2003/0061269 | A1 | 3/2003 | Hathaway et al. |
| 2003/0088697 | A1 | 5/2003 | Matsuhira |
| 2003/0112766 | A1 | 6/2003 | Riedel et al. |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0189919 | A1 | 10/2003 | Gupta et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0165601 | A1 | 8/2004 | Liu et al. |
| 2004/0224771 | A1 | 11/2004 | Chen et al. |
| 2005/0078690 | A1 | 4/2005 | DeLangis |
| 2005/0149604 | A1 | 7/2005 | Navada |
| 2005/0154790 | A1 | 7/2005 | Nagata et al. |
| 2005/0172161 | A1 | 8/2005 | Cruz et al. |
| 2005/0195754 | A1 | 9/2005 | Nosella |
| 2005/0210479 | A1 | 9/2005 | Andjelic |
| 2005/0265255 | A1 | 12/2005 | Kodialam et al. |
| 2006/0002291 | A1 | 1/2006 | Alicherry et al. |
| 2006/0034335 | A1 | 2/2006 | Karaoguz et al. |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0182035 | A1 | 8/2006 | Vasseur |
| 2006/0193247 | A1 | 8/2006 | Naseh et al. |
| 2006/0193252 | A1 | 8/2006 | Naseh et al. |
| 2006/0195605 | A1 | 8/2006 | Sundarrajan et al. |
| 2006/0245414 | A1 | 11/2006 | Susai et al. |
| 2007/0050594 | A1 | 3/2007 | Augsburg et al. |
| 2007/0064604 | A1 | 3/2007 | Chen et al. |
| 2007/0064702 | A1 | 3/2007 | Bates et al. |
| 2007/0083727 | A1 | 4/2007 | Johnston et al. |
| 2007/0091794 | A1 | 4/2007 | Filsfils et al. |
| 2007/0103548 | A1 | 5/2007 | Carter |
| 2007/0115812 | A1 | 5/2007 | Hughes |
| 2007/0121486 | A1 | 5/2007 | Guichard et al. |
| 2007/0130325 | A1 | 6/2007 | Lesser |
| 2007/0162619 | A1 | 7/2007 | Aloni et al. |
| 2007/0162639 | A1 | 7/2007 | Chu et al. |
| 2007/0177511 | A1 | 8/2007 | Das et al. |
| 2007/0195797 | A1 | 8/2007 | Patel et al. |
| 2007/0237081 | A1 | 10/2007 | Kodialam et al. |
| 2007/0260746 | A1 | 11/2007 | Mirtorabi et al. |
| 2007/0268882 | A1 | 11/2007 | Breslau et al. |
| 2008/0002670 | A1 | 1/2008 | Bugenhagen et al. |
| 2008/0049621 | A1 | 2/2008 | McGuire et al. |
| 2008/0055241 | A1 | 3/2008 | Goldenberg et al. |
| 2008/0080509 | A1 | 4/2008 | Khanna et al. |
| 2008/0095187 | A1 | 4/2008 | Jung et al. |
| 2008/0117930 | A1 | 5/2008 | Chakareski et al. |
| 2008/0144532 | A1 | 6/2008 | Chamarajanagar et al. |
| 2008/0168086 | A1 | 7/2008 | Miller et al. |
| 2008/0175150 | A1 | 7/2008 | Bolt et al. |
| 2008/0181116 | A1 | 7/2008 | Kavanaugh et al. |

(56)                 References Cited

U.S. PATENT DOCUMENTS

| | | |
|---|---|---|
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |

(56)                References Cited

U.S. PATENT DOCUMENTS

| | | |
|---|---|---|
| 2014/0321277 A1 | 10/2014 | Lynn, Jr. et al. |
| 2014/0321430 A1* | 10/2014 | Bakker ............. H04W 36/0033 |
| | | 370/331 |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063787 A1* | 3/2017 | Kwok .................... H04L 69/22 |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |

(56) References Cited

U.S. PATENT DOCUMENTS

| | | |
|---|---|---|
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |

(56)　　　　References Cited

U.S. PATENT DOCUMENTS

| | | |
|---|---|---|
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1* | 8/2019 | Bull .................. H04W 92/02 |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |

(56) References Cited

U.S. PATENT DOCUMENTS

| | | |
|---|---|---|
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |

FOREIGN PATENT DOCUMENTS

| | | |
|---|---|---|
| CN | 102811165 A | 12/2012 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| RU | 2574350 C2 | 2/2016 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022082680 A1 | 4/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Alvizu, Rodolfo, et al., "SDN-Based Network Orchestration for New Dynamic Enterprise Networking Services," 2017 19th Inter-

(56) References Cited

OTHER PUBLICATIONS national Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., U.S. Appl. No. 62/925,193, filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/100,369, filed Jan. 23, 2023, 55 pages, VMware, Inc.

Non-Published Commonly Owned U.S. Appl. No. 18/100,381, filed Jan. 23, 2023, 55 pages, VMware, Inc.

Non-Published Commonly Owned U.S. Appl. No. 18/100,397, filed Jan. 23, 2023, 55 pages, VMware, Inc.

Non-Published Commonly Owned U.S. Appl. No. 18/126,989, filed Mar. 27, 2023, 83 pages, VMware, Inc.

Non-Published Commonly Owned U.S. Appl. No. 18/126,990, filed Mar. 27, 2023, 84 pages, VMware, Inc.

Non-Published Commonly Owned U.S. Appl. No. 18/126,991, filed Mar. 27, 2023, 84 pages, VMware, Inc.

Non-Published Commonly Owned U.S. Appl. No. 18/126,992, filed Mar. 27, 2023, 84 pages, VMware, Inc.

Non-Published Commonly Owned U.S. Appl. No. 18/197,090, filed May 14, 2023, 36 pages, Nicira, Inc.

Non-Published Commonly Owned Related U.S. Appl. No. 18/208,352 with similar specification, filed Jun. 12, 2023, 69 pages, VMware, Inc.

Non-Published Commonly Owned Related U.S. Appl. No. 18/208,356 with similar specification, filed Jun. 12, 2023, 69 pages, VMware, Inc.

Non-Published Commonly Owned U.S. Appl. No. 18/211,568, filed Jun. 19, 2023, 37 pages, VMware, Inc.

Non-Published Commonly Owned U.S. Appl. No. 18/222,864, filed Jul. 17, 2023, 350 pages, VMware, Inc.

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/235,879, filed Aug. 20, 2023, 173 pages, VMware, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom

(56) References Cited

OTHER PUBLICATIONS

2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

* cited by examiner

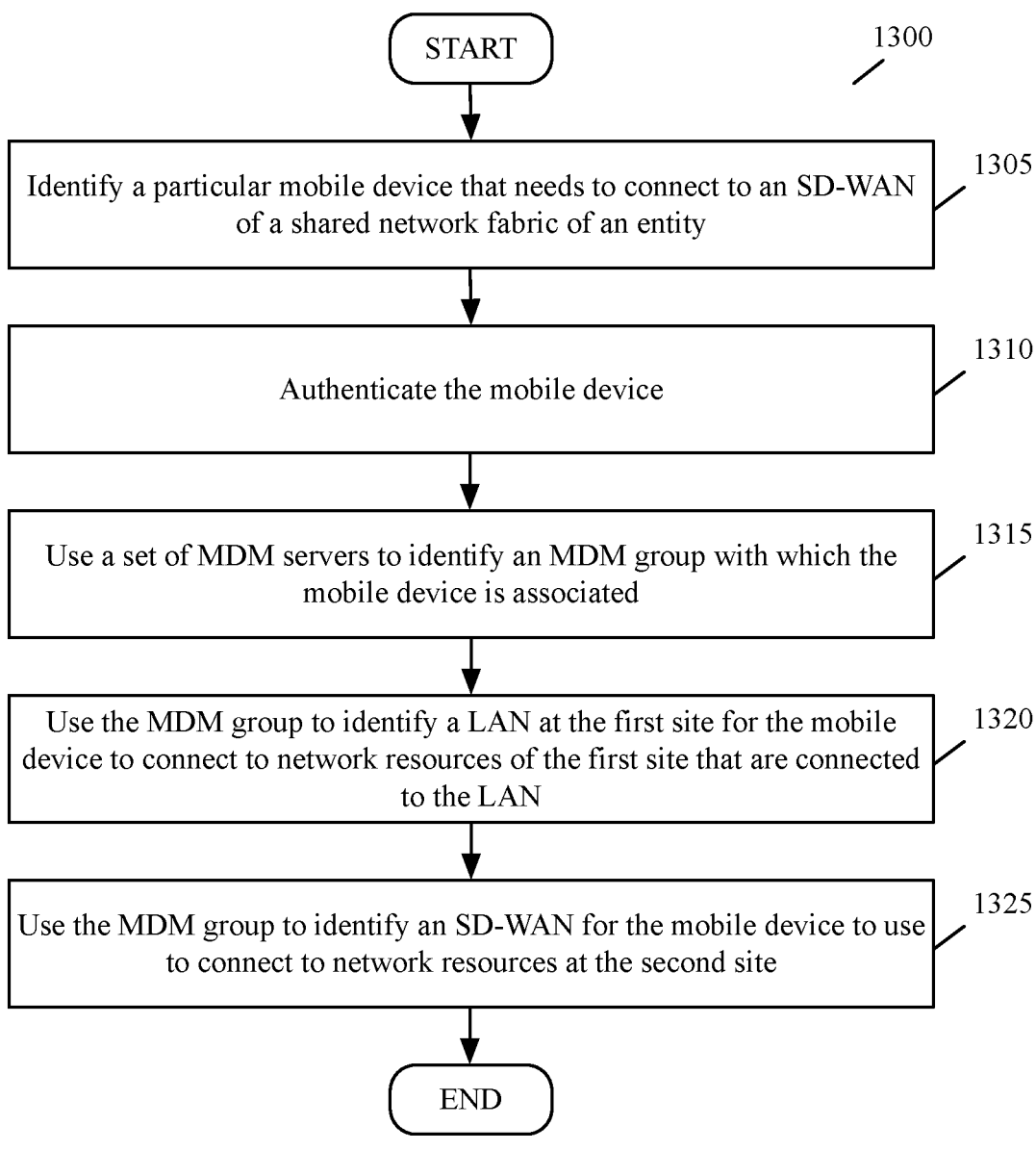

START

1300

Identify a particular mobile device that needs to connect to an SD-WAN of a shared network fabric of an entity

1305

Authenticate the mobile device

1310

Use a set of MDM servers to identify an MDM group with which the mobile device is associated

1315

Use the MDM group to identify a LAN at the first site for the mobile device to connect to network resources of the first site that are connected to the LAN

1320

Use the MDM group to identify an SD-WAN for the mobile device to use to connect to network resources at the second site

1325

END

*Figure 13*

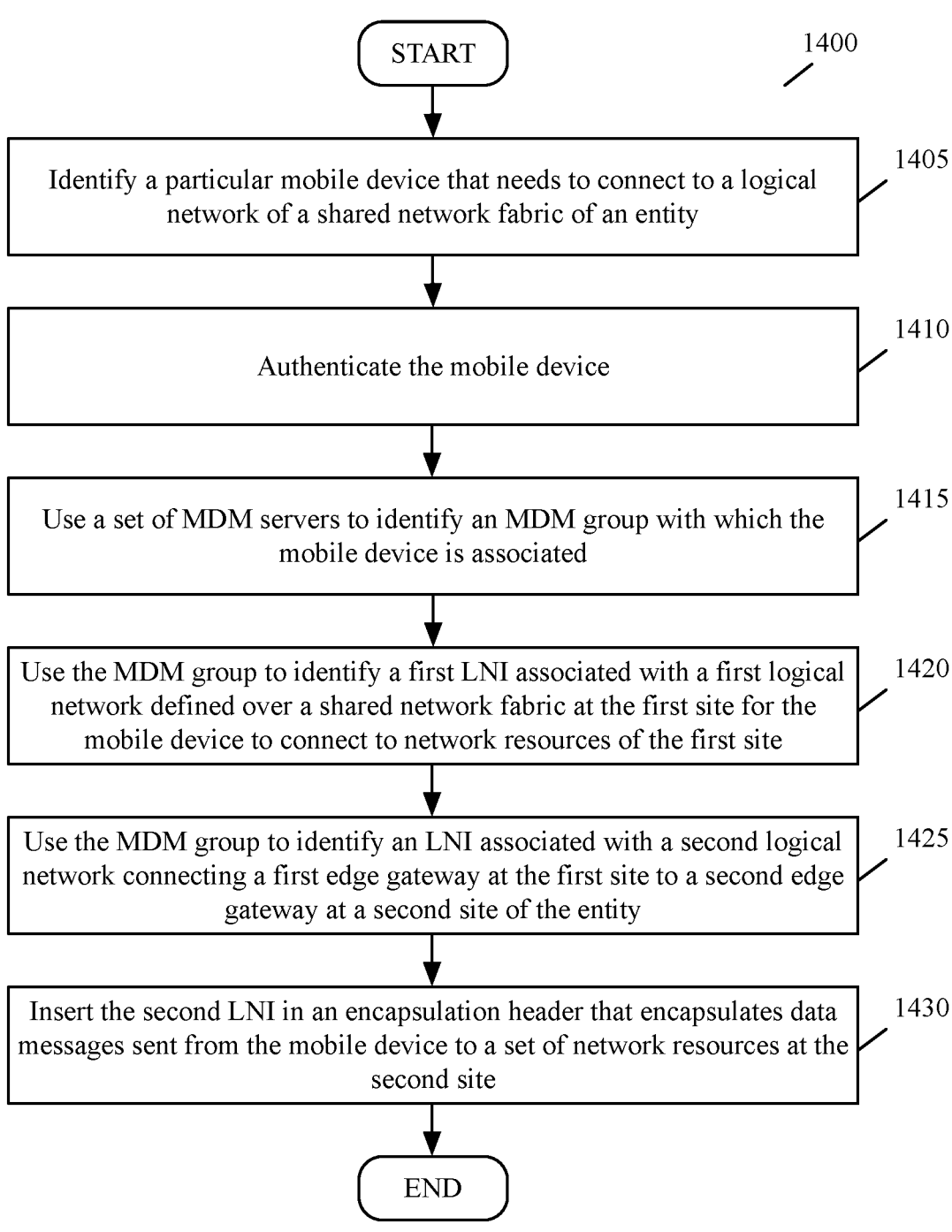

1400

START

Identify a particular mobile device that needs to connect to a logical network of a shared network fabric of an entity     1405

Authenticate the mobile device     1410

Use a set of MDM servers to identify an MDM group with which the mobile device is associated     1415

Use the MDM group to identify a first LNI associated with a first logical network defined over a shared network fabric at the first site for the mobile device to connect to network resources of the first site     1420

Use the MDM group to identify an LNI associated with a second logical network connecting a first edge gateway at the first site to a second edge gateway at a second site of the entity     1425

Insert the second LNI in an encapsulation header that encapsulates data messages sent from the mobile device to a set of network resources at the second site     1430

END

*Figure 14*

DYNAMICALLY ASSOCIATING MOBILE DEVICES WITH DIFFERENT LOGICAL NETWORKS IMPLEMENTED ON A SHARED NETWORK FABRIC OF A SINGLE ENTITY

BACKGROUND

At different physical sites of an entity (e.g., a corporation), data message flows of users' endpoints (e.g., wired and wireless devices) are not dynamically isolated from other data message flows of other users' endpoints based on user identity, user role within the entity, and endpoint identity. Methods and systems are needed for isolating traffic between different users of a shared network fabric of an entity.

BRIEF SUMMARY

Some embodiments provide a novel method for dynamically associating mobile devices with different software-defined wide area networks (SD-WANs) implemented for different user groups of a single shared network fabric of a single entity. The method identifies a particular mobile device that is trying to connect to a managed network switch. The method uses a set of one or more mobile device management (MDM) servers to identify a set of attributes associated with the particular mobile device attempting to access the shared network fabric. The method uses the identified set of attributes to identify an SD-WAN tenant identifier (ID) associated with a particular SD-WAN established for a group of devices including the particular mobile device. The method provides the SD-WAN tenant ID to the managed network switch to store in encapsulating headers that the managed network switch uses to encapsulate data message flows from the particular mobile device before forwarding the data message flows to one or more resources in the shared network fabric.

Some embodiments establish different SD-WANs for different user groups in order to isolate traffic between the different user groups. The managed network switch in some embodiments encapsulates different data message flows from different wired and wireless devices, including the particular mobile device, to forward the different data message flows to different resources in the shared network fabric. In some embodiments, the shared network fabric includes at least one of datacenter sites, branch sites, and cloud sites. The particular mobile device in some embodiments resides in a particular branch site of the shared network fabric. In some embodiments, the MDM server set resides in the particular branch site along with the particular mobile device. In these embodiments, the MDM server set performs operations for each mobile device in the particular branch site. In other embodiments, the MDM server set resides in a cloud site of the shared network fabric. In these embodiments, the MDM server set performs operations for mobile devices in one or more branch sites that do not include an MDM server set.

The method of some embodiments identifies the particular mobile device by identifying a media access control (MAC) address of the particular mobile device. In such embodiments, the method supplies the MAC address of the particular mobile device to the MDM server set in order to retrieve the set of attributes. In some embodiments, the set of attributes includes a user group ID associated with a particular user group to which the particular mobile device belongs. In such embodiments, the method supplies the MAC address of the particular mobile device to the MDM server set to identify the user group ID. The user group ID is in some embodiments further associated with a particular user of the particular mobile device.

In some embodiments, in identifying the particular mobile device, the method also identifies authentication credentials of a particular user of the particular mobile device. The authentication credentials in some embodiments include a username and password for the particular user. Unique usernames and passwords are associated with each user of the shared network fabric in order to authenticate each user. In some embodiments, before using the MDM server set to identify the set of attributes, the method authenticates the particular user using the username and password. In some embodiments, this is performed using an authentication server, which resides in the particular branch site or in the cloud site of the shared network fabric.

In some embodiments, the MDM server set maintains mappings between MAC addresses and user group IDs including a particular mapping between the MAC address of the particular mobile device and the user group ID associated with the particular user group to which the particular mobile device belongs. These mappings are stored in some embodiments in a local storage or memory of the MDM server set. The MDM server set in other embodiments associates the MAC address of the particular mobile device to the user group ID using a set of policies defined by a network administrator of the shared network fabric.

In some embodiments, the set of attributes also includes a user subgroup ID for a particular user subgroup of the particular user of the particular mobile device. In such embodiments, users are segmented into both groups and subgroups in order to further isolate traffic between users. The method of some embodiments uses the user subgroup ID to identify a virtual local area network (VLAN) tag for the particular user subgroup. This VLAN tag specifies a particular VLAN of the particular SD-WAN for the particular user subgroup.

The method of some embodiments provides, along with the SD-WAN tenant ID, the VLAN tag to the managed network switch to store in the encapsulating headers that the managed network switch uses to encapsulate the data message flows. In some embodiments, the managed network switch encapsulates the SD-WAN tenant ID and the VLAN tag in different encapsulating headers of the data message flows. In other embodiments, the managed network switch encapsulates the SD-WAN tenant ID and the VLAN tag in a same encapsulating header of the data message flows.

Some embodiments provide a novel method for dynamically associating mobile devices with different SD-WANs implemented on a shared network fabric of an entity. At least two different SD-WANs are implemented for at least two different groups of the entity. At a first site of the entity connected to a second site of the entity through the SD-WANs, the method identifies a particular mobile device that needs to connect to an SD-WAN. The method uses a set of one or more MDM servers to identify an MDM group with which the particular mobile device is associated. The method uses the identified MDM group to identify a particular local area network (LAN) at the first site for the particular mobile device to connect to network resources of the first site that are connected to the particular LAN. The method uses the identified MDM group to identify a particular SD-WAN for the particular mobile device to use to connect to a second site to have access to a set of one or more network resources at the second site.

In some embodiments, using the identified MDM group to identify the particular LAN at the first site for the particular mobile device to connect to the network resources of the first site includes inserting in a first encapsulating header, which is used to send a first set of encapsulated data messages between the particular mobile device and the network resources of the first site, a LAN identifier associated with the LAN. By encapsulating data messages sent between the particular mobile device and the network resources of the first site with the LAN identifier, the data messages will be sent through the LAN. In some embodiments, the LAN identifier is inserted into encapsulating headers by an SD-WAN edge appliance operating at the first site to forward the encapsulated data message flows to the network resources of the first site.

Using the identified MDM group to identify the particular SD-WAN for the particular mobile device to use to connect to the second site in some embodiments includes inserting in a second encapsulating header, which is used to send a second set of encapsulated data messages between the particular mobile device and the set of network resources at the second site, an SD-WAN identifier associated with the particular SD-WAN. By encapsulating data messages sent between the particular mobile device and the set of network resources at the second site with the SD-WAN identifier, the data messages will be sent through the SD-WAN. In some embodiments, the SD-WAN identifier is inserted into encapsulating headers by an SD-WAN edge appliance operating at the first site to forward the encapsulated data message flows to an orchestration service operating at the second site. In some embodiments, the LAN identifier is different from the SD-WAN identifier. In other embodiments, the LAN identifier and the SD-WAN identifier are the same identifier.

The method of some embodiments is performed by a set of software-defined edge network (SDEN) servers implementing an SDEN control plane at the first site. In such embodiments, an SDEN management plane operates in the second site along with an orchestration service (e.g., a VeloCloud® orchestration service) to connect to the first site. In some embodiments, the network resources include one or more of servers (e.g., virtual machines (VMs), containers, Pods, etc.), applications, middlebox services (e.g., firewall services, network address translation services, load balancing services, etc.), and forwarding elements (e.g., routers, switches, etc.).

At least two different SD-WANs are implemented for at least two different groups of the entity in some embodiments. These groups are in some embodiments different user groups of the entity. These groups in other embodiments are different device groups of the entity. The groups in other embodiments are a combination of user and device groups of the entity. The first site in some embodiments is a branch site of the entity, while the second site is a cloud site of the entity.

In some embodiments, the MDM group is identified by using the set of MDM servers to identify a device group to which the particular mobile device belongs. In such embodiments, the SDEN control plane provides the device's MAC address to the MDM server set to determine the device group. A device group is in some embodiments defined based on the device type, such as a first group for laptops, a second group for smartphones, a third group for tablets, etc.

In other embodiments, the SDEN control plane determines to which user group the user of the mobile device belongs. In such embodiments, the SDEN control plane provides the user's credentials to the MDM server set to determine the user group. The SDEN control plane of some embodiments also provides the device's MAC address along with the user's credentials to identify the user group. In some embodiments, a user group is a group of members of the entity that share a set of characteristics. The set of characteristics in some embodiments include at least one of a shared responsibility for the entity, a shared role within the entity, and a shared subgroup of the entity.

The particular LAN of some embodiments is a first logical network of several logical networks implemented at the first site for several different groups of mobile devices. These logical networks are implemented in some embodiments to isolate data message flows between the different groups.

Some embodiments provide a novel method for dynamically associating mobile devices with different logical networks implemented on a shared network fabric of an entity. At least two different logical networks are implemented for at least two different groups of the entity. At a first site of the entity, the method authenticates a particular mobile device. The method uses a set of one or more MDM servers to identify an MDM group with which the particular mobile device is associated. The method uses the identified MDM group to identify a first logical network that is defined over a shared network fabric at the first site for the particular mobile device to connect to network resources of the first site that are connected to the first logical network. The method uses the identified MDM group to identify a logical network identifier (LNI) associated with a second logical network connecting a first edge gateway at the first site to a second edge gateway at a second site of the entity. The method inserts the LNI in an encapsulation header that encapsulates data messages sent from the particular mobile device to a set of one or more network resources at the second site.

The second logical network identified by the LNI in some embodiments (1) spans the first and second sites and (2) connects the particular mobile device at the first site to the set of one or more network resources at the second site. In some embodiments, the encapsulation header is a tunnel header used to send the data messages from the first edge gateway to the second edge gateway through a tunnel established between the first and second edge gateways. This tunnel connects the first and second sites so that the particular mobile device is able to access the set of network resources at the second site. Because the data messages sent from the particular mobile device are sent using a secure connection (i.e., a tunnel), the particular mobile device can be seen as in the same overlay network as the set of network resources in the second site.

In some embodiments, the LNI is inserted into the encapsulating header by a tier-0 (T0) router operating at the first site to forward the encapsulated data messages to an edge node (or another T0 router) at the second site. The first logical network in some embodiments also has an associated LNI. In some embodiments, the first logical network LNI is the same as the second logical network LNI, as the first and second logical networks are one network. In other embodiments, the first logical network LNI is different than the second logical network LNI, as the first and second logical networks are two different logical networks with the first logical network being a logical local area network (LAN) and the second logical network being a logical wide area network (WAN). The logical LAN spans only the first site, while the logical WAN spans at least the first and second sites.

The encapsulation header used to send the data messages from the first edge gateway to the second edge gateway is in some embodiments a first tunnel header, and the data messages sent to the second site are in some embodiments a first set of data messages. In such embodiments, the method also inserts the first logical network LNI in a second encapsulation header that encapsulates a second set of data messages sent from the particular mobile device to the network resources of the first site. The second encapsulation header is also a tunnel header used to send the second set of data messages through a tunnel or a secure connection in some embodiments.

The method of some embodiments is performed by a set of SDEN servers implementing an SDEN control plane at the first site. In such embodiments, an SDEN management plane operates in the second site along with a software-defined network (SDN) management plane, an SDN control plane, and an SDN edge gateway to connect to the first site. In some embodiments, the network resources include one or more of servers (e.g., VMs, containers, Pods, etc.), applications, middlebox services (e.g., firewall services, network address translation services, load balancing services, etc.), and forwarding elements (e.g., routers, switches, etc.).

At least two different logical networks are implemented for at least two different groups of the entity in some embodiments. These groups are in some embodiments different user groups of the entity. These groups in other embodiments are different device groups of the entity. The groups in other embodiments are a combination of user and device groups of the entity. The first site in some embodiments is a branch site of the entity, while the second site is a cloud site of the entity.

In some embodiments, the particular mobile device is authenticated by receiving a set of authentication credentials from the particular mobile device and using the set of authentication credentials to authenticate the particular mobile device. The set of authentication credentials in some embodiments includes a username and password of a user of the particular mobile device. In some embodiments, the method directs an authentication server operating at the first site to authenticate the particular mobile device. In other embodiments, the method directs an authentication server operating at the second site to authenticate the particular mobile device by providing the set of authentication credentials to the authentication server.

In some embodiments, the MDM group is identified by using the set of MDM servers to identify a device group to which the particular mobile device belongs. In such embodiments, the SDEN control plane provides the device's MAC address to the MDM server set to determine the device group. A device group is in some embodiments defined based on the device type, such as a first group for laptops, a second group for smartphones, a third group for tablets, etc. In other embodiments, the SDEN control plane determines to which user group the user of the mobile device belongs. In such embodiments, the SDEN control plane provides the user's credentials to the MDM server set to determine the user group. The SDEN control plane of some embodiments also provides the device's MAC address along with the user's credentials to identify the user group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 13 conceptually illustrates a process of some embodiments for dynamically associating mobile devices with different SD-WANs on a shared network fabric of an entity.

FIG. 14 conceptually illustrates a process of some embodiments for dynamically associating mobile devices with different logical networks implemented on a shared network fabric of an entity.

DETAILED DESCRIPTION

Figure 1:
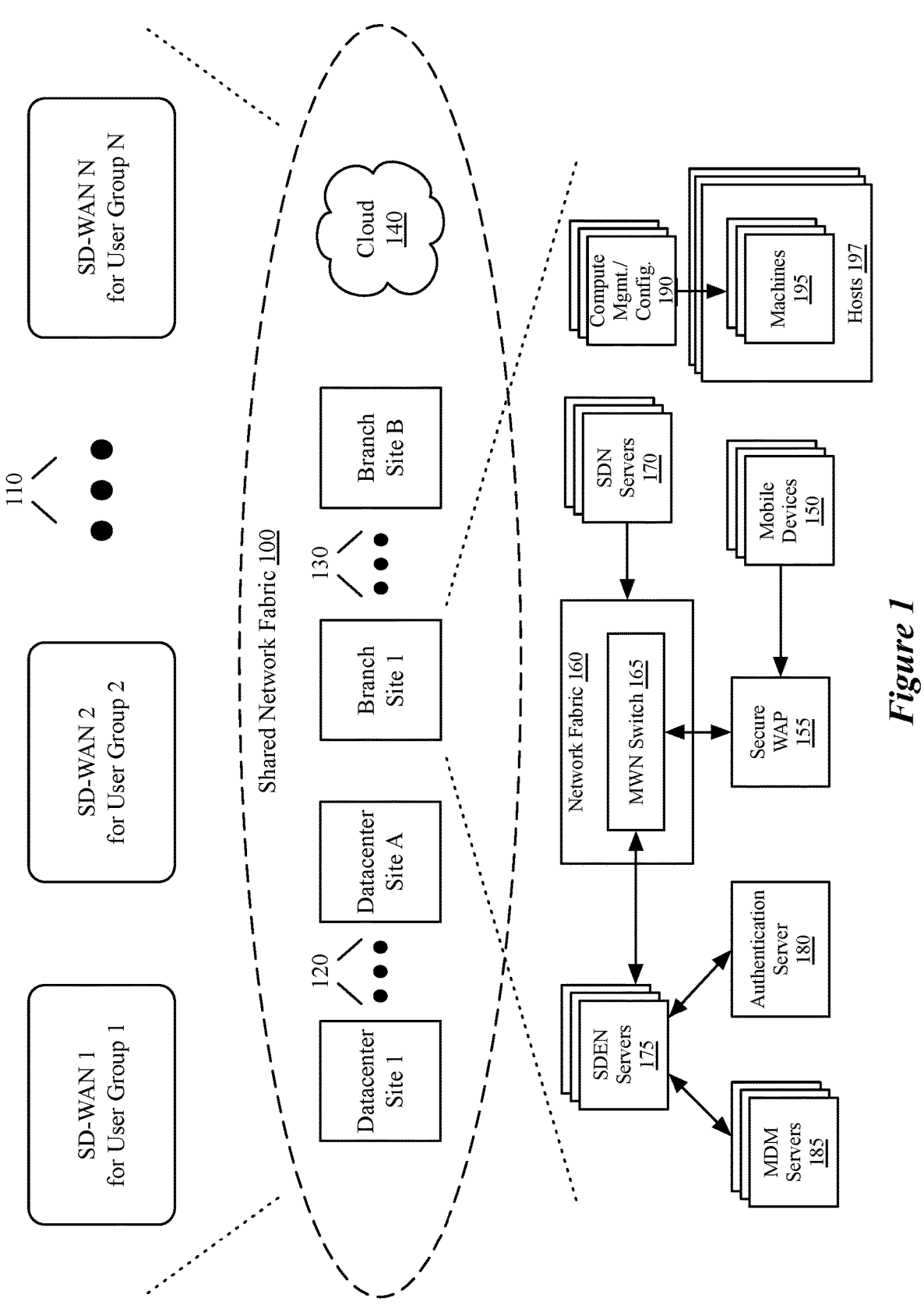
FIG. 1 illustrates a shared network fabric used by several users of a single entity to implement one or more SD-WANs for different user groups.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for dynamically associating mobile devices with different software-defined wide area networks (SD-WANs) implemented for different user groups of a single shared network fabric of a single entity. The method identifies a particular mobile device that is trying to connect to a managed network switch. The method uses a set of one or more mobile device management (MDM) servers to identify a set of attributes associated with the particular mobile device attempting to access the shared network fabric. The method uses the identified set of attributes to identify an SD-WAN tenant identifier (ID) associated with a particular SD-WAN established for a group of devices including the particular mobile device. The method provides the SD-WAN tenant ID to the managed network switch to store in encapsulating headers that the managed network switch uses to encapsulate data message flows from the particular mobile device before forwarding the data message flows to one or more resources in the shared network fabric.

Some embodiments establish different SD-WANs for different user groups in order to isolate traffic between the different user groups. The managed network switch in some embodiments encapsulates different data message flows from different wired and wireless devices, including the particular mobile device, to forward the different data message flows to different resources in the shared network fabric. In some embodiments, the shared network fabric includes at least one of datacenter sites, branch sites, and cloud sites. The particular mobile device in some embodiments resides in a particular branch site of the shared network fabric. In some embodiments, the MDM server set resides in the particular branch site along with the particular mobile device. In these embodiments, the MDM server set performs operations for each mobile device in the particular branch site. In other embodiments, the MDM server set resides in a cloud site of the shared network fabric. In these embodiments, the MDM server set performs operations for mobile devices in one or more branch sites that do not include an MDM server set.

The method of some embodiments identifies the particular mobile device by identifying a media access control (MAC) address of the particular mobile device. In such embodiments, the method supplies the MAC address of the particular mobile device to the MDM server set in order to retrieve the set of attributes. In some embodiments, the set of attributes includes a user group ID associated with a particular user group to which the particular mobile device belongs. In such embodiments, the method supplies the MAC address of the particular mobile device to the MDM server set to identify the user group ID. The user group ID is in some embodiments further associated with a particular user of the particular mobile device.

In some embodiments, the set of attributes also includes a user subgroup ID for a particular user subgroup of the particular user of the particular mobile device. In such embodiments, users are segmented into both groups and subgroups in order to further isolate traffic between users. The method of some embodiments uses the user subgroup ID to identify a virtual local area network (VLAN) tag for the particular user subgroup. This VLAN tag specifies a particular VLAN of the particular SD-WAN for the particular user subgroup.

The method of some embodiments provides, along with the SD-WAN tenant ID, the VLAN tag to the managed network switch to store in the encapsulating headers that the managed network switch uses to encapsulate the data message flows. In some embodiments, the managed network switch encapsulates the SD-WAN tenant ID and the VLAN tag in different encapsulating headers of the data message flows. In other embodiments, the managed network switch encapsulates the SD-WAN tenant ID and the VLAN tag in a same encapsulating header of the data message flows.

Some embodiments provide a novel method for dynamically associating mobile devices with different SD-WANs implemented on a shared network fabric of an entity. At least two different SD-WANs are implemented for at least two different groups of the entity. At a first site of the entity connected to a second site of the entity through the SD-WANs, the method identifies a particular mobile device that needs to connect to an SD-WAN. The method uses a set of one or more MDM servers to identify an MDM group with which the particular mobile device is associated. The method uses the identified MDM group to identify a particular local area network (LAN) at the first site for the particular mobile device to connect to network resources of the first site that are connected to the particular LAN. The method uses the identified MDM group to identify a particular SD-WAN for the particular mobile device to use to connect to a second site to have access to a set of one or more network resources at the second site.

In some embodiments, using the identified MDM group to identify the particular LAN at the first site for the particular mobile device to connect to the network resources of the first site includes inserting in a first encapsulating header, which is used to send a first set of encapsulated data messages between the particular mobile device and the network resources of the first site, a LAN identifier associated with the LAN. By encapsulating data messages sent between the particular mobile device and the network resources of the first site with the LAN identifier, the data messages will be sent through the LAN. In some embodiments, the LAN identifier is inserted into encapsulating headers by an SD-WAN edge appliance operating at the first site to forward the encapsulated data message flows to the network resources of the first site.

Using the identified MDM group to identify the particular SD-WAN for the particular mobile device to use to connect to the second site in some embodiments includes inserting in a second encapsulating header, which is used to send a second set of encapsulated data messages between the particular mobile device and the set of network resources at the second site, an SD-WAN identifier associated with the particular SD-WAN. By encapsulating data messages sent between the particular mobile device and the set of network resources at the second site with the SD-WAN identifier, the data messages will be sent through the SD-WAN. In some embodiments, the SD-WAN identifier is inserted into encapsulating headers by an SD-WAN edge appliance operating at the first site to forward the encapsulated data message flows to an orchestration service operating at the second site. In some embodiments, the LAN identifier is different from the SD-WAN identifier. In other embodiments, the LAN identifier and the SD-WAN identifier are the same identifier.

The method of some embodiments is performed by a set of software-defined edge network (SDEN) servers implementing an SDEN control plane at the first site. In such embodiments, an SDEN management plane operates in the second site along with an orchestration service (e.g., a VeloCloud® orchestration service) to connect to the first site. In some embodiments, the network resources include one or more of servers (e.g., virtual machines (VMs), containers, Pods, etc.), applications, middlebox services (e.g., firewall services, network address translation services, load balancing services, etc.), and forwarding elements (e.g., routers, switches, etc.).

The particular LAN of some embodiments is a first logical network of several logical networks implemented at the first site for several different groups of mobile devices. These logical networks are implemented in some embodiments to isolate data message flows between the different groups.

Some embodiments provide a novel method for dynamically associating mobile devices with different logical networks implemented on a shared network fabric of an entity. At least two different logical networks are implemented for at least two different groups of the entity. At a first site of the entity, the method authenticates a particular mobile device. The method uses a set of one or more MDM servers to identify an MDM group with which the particular mobile device is associated. The method uses the identified MDM group to identify a first logical network that is defined over a shared network fabric at the first site for the particular mobile device to connect to network resources of the first site that are connected to the first logical network. The method uses the identified MDM group to identify a logical network identifier (LNI) associated with a second logical network connecting a first edge gateway at the first site to a second edge gateway at a second site of the entity. The method inserts the LNI in an encapsulation header that encapsulates data messages sent from the particular mobile device to a set of one or more network resources at the second site.

The second logical network identified by the LNI in some embodiments (1) spans the first and second sites and (2) connects the particular mobile device at the first site to the set of one or more network resources at the second site. In some embodiments, the encapsulation header is a tunnel header used to send the data messages from the first edge gateway to the second edge gateway through a tunnel established between the first and second edge gateways. This tunnel connects the first and second sites so that the particular mobile device is able to access the set of network resources at the second site. Because the data messages sent from the particular mobile device are sent using a secure connection (i.e., a tunnel), the particular mobile device can be seen as in the same overlay network as the set of network resources in the second site.

In some embodiments, the LNI is inserted into the encapsulating header by a tier-0 (T0) router operating at the first site to forward the encapsulated data messages to an edge node (or another T0 router) at the second site. The first logical network in some embodiments also has an associated LNI. In some embodiments, the first logical network LNI is the same as the second logical network LNI, as the first and second logical networks are one network. In other embodiments, the first logical network LNI is different than the second logical network LNI, as the first and second logical networks are two different logical networks with the first logical network being a logical local area network (LAN) and the second logical network being a logical wide area network (WAN). The logical LAN spans only the first site, while the logical WAN spans at least the first and second sites.

The encapsulation header used to send the data messages from the first edge gateway to the second edge gateway is in some embodiments a first tunnel header, and the data messages sent to the second site are in some embodiments a first set of data messages. In such embodiments, the method also inserts the first logical network LNI in a second encapsulation header that encapsulates a second set of data messages sent from the particular mobile device to the network resources of the first site. The second encapsulation header is also a tunnel header used to send the second set of data messages through a tunnel or a secure connection in some embodiments.

The method of some embodiments is performed by a set of SDEN servers implementing an SDEN control plane at the first site. In such embodiments, an SDEN management plane operates in the second site along with a software-defined network (SDN) management plane, an SDN control plane, and an SDN edge gateway to connect to the first site. In some embodiments, the network resources include one or more of servers (e.g., VMs, containers, Pods, etc.), applications, middlebox services (e.g., firewall services, network address translation services, load balancing services, etc.), and forwarding elements (e.g., routers, switches, etc.).

FIG. 1 illustrates a shared network fabric 100, used by several users of a single entity, to implement one or more SD-WANs 110 for different user groups. The shared network fabric 100 includes, in some embodiments, one or more datacenter sites 120, one or more branch sites 130, and a cloud 140. The datacenter sites 120 and branch sites 130 can each reside in a different geographic location (also referred to as a physical site).

The datacenter sites 120 and the branch sites 130 in some embodiments each include a set of resources, which may include servers, hosts, routers, switches, and/or other physical or logical elements (e.g., VM, containers, etc.). The resources may communicate with resources of other branches and/or other resources outside of their own site through forwarding elements (e.g., edge nodes, gateways, etc.). A datacenter forwarding node is referred to as a hub node because in some embodiments this forwarding node can be used to connect (e.g., through a virtual private network (VPN) tunnel) to other edge forwarding nodes of the branch sites 130. A hub node in some embodiments provides services (e.g., middlebox services) for data messages that it forwards from one branch site to another branch site. A hub node in some embodiments also provides access to the datacenter's resources.

In some embodiments, the cloud 140 spans each physical site of the datacenter sites 120 and branch sites 130. In this example, the shared network fabric 100 includes one cloud 140. However, in other embodiments, the shared network fabric 100 includes multiple clouds. The cloud 140 of some embodiments includes a set of one or more cloud resources, such as a cloud gateway (CGW). The CGW in some embodiments connects the datacenter sites 120 and branch sites 130 (e.g., using VPN tunnels).

In some embodiments, one branch site 130 includes a set of one or more mobile devices 150, a secure wireless access point (WAP) 155, a network fabric 160 including a managed wireless network (MWN) switch 165, a set of one or more SDN servers 170, a set of one or more SDEN servers 175, an authentication server 180, a set of one or more mobile device management (MDM) servers 185, a set of compute management/configuration servers 190, and a set of one or more machines 195 executing on a set of one or more host computers 197. Each branch site 130 can include any number of each of these components. In other embodiments, different branch sites include at least a subset of the components 150-197. The compute management/configuration server set 190 in some embodiments manages and configures the machines 195 executing on the hosts 197. The machines 195 can include one or more of VMs, containers, pods, etc.

In some embodiments, the SDN server set 170 includes one or more managers and/or one or more controllers responsible for configuring the network fabric 160 of the branch site, including the managed wireless network switch 165. The managed wireless network switch 165 is in some embodiments a hardware switch, and, in other embodiments, is a software or virtual switch. In some embodiments, it is a wired switch connected by a physical link to the secure WAP 155. In other embodiments, it is a wireless switch connected, e.g., by a secure tunnel, to the secure WAP 155.

The shared network fabric 100 is used by several users of a single entity. For example, the shared network fabric 100 in some embodiments is used by employees of a single enterprise or corporation. In order to isolate traffic of different user groups (e.g., of different departments of the corporation), the shared network fabric 100 in some embodiments implements a different SD-WAN 110 for each user group that uses the shared network fabric 100. Any number of SD-WANs may be created for any number of user groups. In some embodiments, one SD-WAN is created for each user group. In other embodiments, at least one user group has multiple SD-WANs created for it.

In some embodiments, each device of each user in a user group is associated with a tenant identifier (ID). For instance, each device associated with a first SD-WAN is associated with a first set of one or more tenant IDs for the first SD-WAN, while each device associated with a second SD-WAN is associated with a second set of one or more tenant IDs for the second SD-WAN. In some embodiments, each user and each device for a particular user group is associated with the same tenant ID for the SD-WAN of the user group. In other embodiments, different tenant IDs are associated with the different users, meaning that all devices of a particular user are associated with a user-specific tenant ID for the SD-WAN of the user group. Still, in other embodiments, different tenant IDs are associated with different types of devices, meaning that each different type of device (e.g., desktop computer, laptop computer, mobile phone, etc.) of one user is associated with a different tenant ID for one SD-WAN of the user group. In such embodiments, the same type of device for different users is associated with the same tenant ID in some embodiments, while, in other embodiments, same-type devices of different users are associated with different tenant IDs.

To associate user devices with an SD-WAN, some embodiments use a set of SDEN servers 175. As shown, the SDEN server set 175 of some embodiments is deployed in a branch site 130. An SDEN server set 175 of some embodiments allows for users of the shared network fabric 100 to be automatically recognized based on user and/or device identity and added to the correct SD-WAN. For example, a mobile device 150 sends a request to access the shared network fabric 100 to the secure WAP 155. The secure WAP 155 verifies a signature of the mobile device 150. In some embodiments, the secure WAP 155 verifies the signature of a particular application used by the mobile device to provide user credentials (e.g., a username and password). Once the secure WAP 155 verifies the mobile device's signature, the secure WAP 155 instantiates a secure (e.g., encrypted) channel between the secure WAP 155 and the mobile device 150 to collect user attributes, such as the user's ID, a password, and/or a media access control (MAC) address of the mobile device. In some embodiments, the collected MAC address is the source MAC address of the mobile device 150.

Then, the secure WAP 155 sends the collected user attributes to the SDEN server set 175 through the managed wireless network switch 165. Using the user's attributes, the SDEN server set 175 authenticates the user using the authentication server 180. In some embodiments, the authentication server 180 is a Remote Authentication Dial-In User Service (RADIUS) server. Once the user has been authenticated, the SDEN server set 175 supplies the collected user attributes (e.g., the user ID and/or MAC address) to the MDM server set 185. In some embodiments, an MDM server set is deployed in each branch site 130. In other embodiments, one MDM server set is deployed in the cloud 140 for each branch site 130. Still, in other embodiments, a subset of branch sites deploy their own MDM server set, while another subset of branch sites use an MDM server set in the cloud 140.

The MDM server set 185 in some embodiments provides one or more MDM attributes for the mobile device 150, the user (of the mobile device), and/or application (executing on the mobile device) requesting access to the shared network fabric 100. The MDM server set 185 in some embodiments is the server set that also provisions mobile devices for accessing the resources of the shared network fabric 100. Provisioning in different embodiments involves different combinations of the following operations: (1) adding the mobile device's identifier to a list of mobile devices that can have remote access, (2) adding a user identifier to identify one or more users that can have remote access through the mobile device, (3) providing VPN access software and/or settings to the mobile device so that the mobile device can set up secure VPN remote access with the datacenter, and (4) defining tenant information, like corporation identifier, user entitlements, etc.

After receiving the user attributes, the MDM server set 185 of some embodiments determines one or more user group attributes of a particular user group to which the user of the mobile device 150 belongs. In some embodiments, the MDM server set 185 maintains mappings between user attributes and user group attributes. The MDM server set 185 of some embodiments maintains mappings between MAC addresses of devices 150 and user group IDs. These mappings are stored in a local storage or memory of the MDM server set 185, in some embodiments. The MDM server set 185 of some embodiments associates user attributes (e.g., MAC addresses) to user group attributes (e.g., user group IDs) using a set of policies defined by a network administrator of the shared network fabric 100.

The SDEN server set 175 receives one or more user group attributes from the MDM server set 185. For example, the SDEN server set 175 of some embodiments receives a user group ID corresponding to the particular department of the corporation to which the user of the mobile device 150 belongs. Using the obtained user group attributes, the SDEN server set 175 identifies a tenant ID for the user and/or the user group. This tenant ID specifies which SD-WAN 110 the user should be placed. After identifying the tenant ID, the SDEN server set 175 provides the SD-WAN tenant ID to the managed wireless network switch 165. Then, the managed wireless network switch 165 encapsulates communications sent from the mobile device 150 through the secure WAP 155 with the tenant ID (e.g., in an encapsulating header) to forward to other resources in the branch site 130, a datacenter site 120, other branch sites, or the cloud 140.

Figure 2:
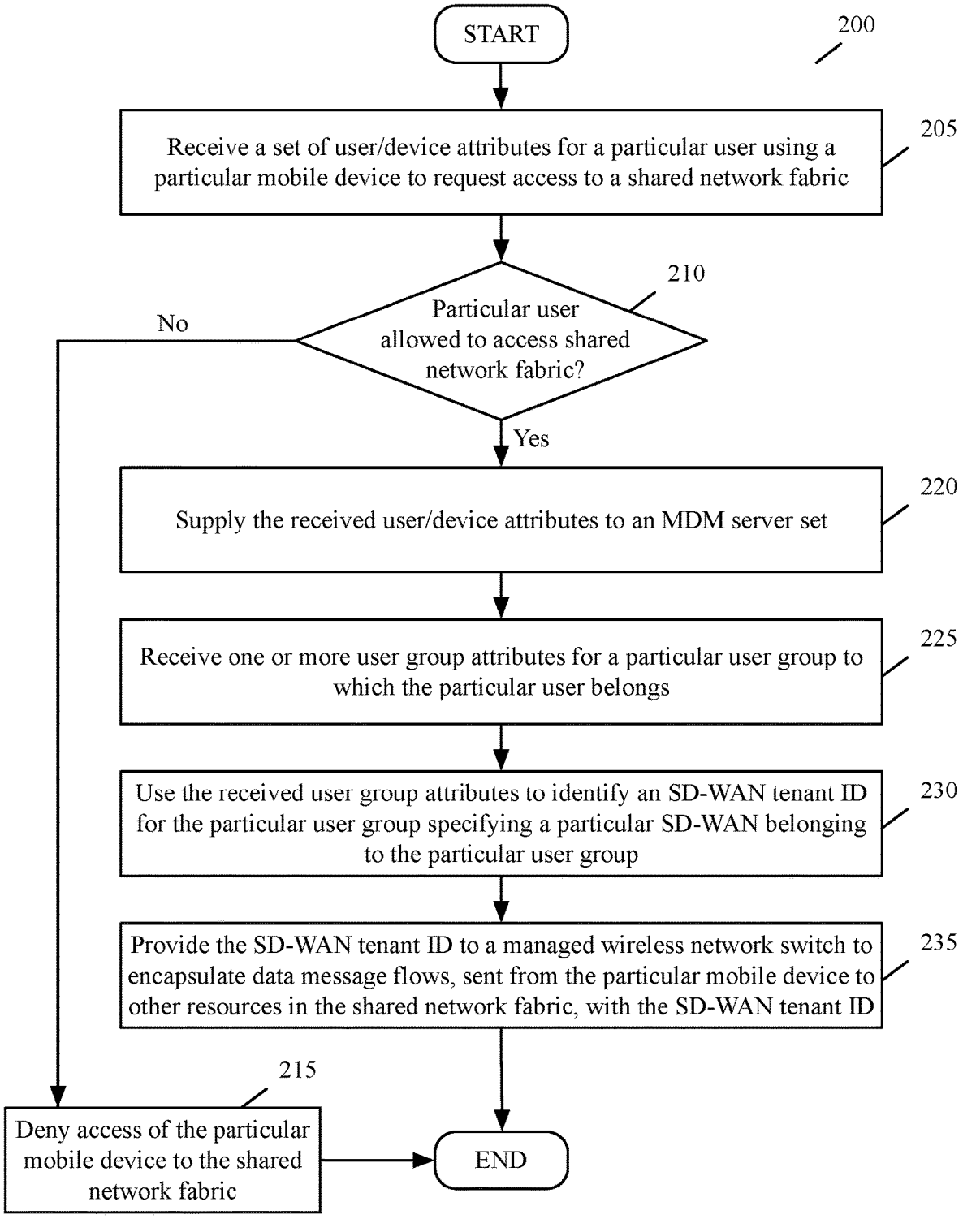
FIG. 2 conceptually illustrates a process of some embodiments for dynamically associating mobile devices with different SD-WANs implemented for different user groups of a single shared network fabric of a single entity.

FIG. 2 conceptually illustrates a process 200 of some embodiments for dynamically associating mobile devices with different SD-WANs implemented for different user groups of a single shared network fabric of a single entity (e.g., a corporation). The process 200 of some embodiments is performed by a set of one or more SDEN severs operating in a branch site for a particular mobile device at the branch site. In some embodiments, the process 200 is performed after a secure WAP has received a request for access to a shared network fabric from the particular mobile device, and collected user and/or device attributes from the particular mobile device, such as a MAC address of the particular mobile device and a username and password of a particular user using the particular mobile device.

The process 200 begins by receiving (at 205) a set of user/device attributes for the particular user using the particular mobile device to request access to a shared network fabric of an entity. In some embodiments, the SDEN server set receives a MAC address of the particular mobile device, and authentication credentials (e.g., a username and password) for the particular user from a managed wireless network switch in the branch site. The managed wireless network switch in some embodiments receives these attributes from a secure WAP that enables communication between the particular mobile device and the managed wireless network switch.

Next, the process 200 determines (at 210) whether the particular user is allowed to access the shared network fabric. In some embodiments, the shared network fabric is only able to be accessed by authorized users (i.e., employees or authorized guests) of the corporation. In such embodiments, the SDEN server set uses an authentication server (e.g., a RADIUS server) to authenticate the user's authentication credentials. If the process 200 determines that the particular user is not allowed to access the shared network fabric, the process 200 denies (at 215) access of the particular mobile device to the shared network fabric, and the process 200 ends. In some embodiments, the SDEN server set sends a notification of access denial to the managed wireless network switch, which provides the notification to the particular mobile device through the secure WAP.

If the process 200 determines that the particular user is allowed to access the shared network fabric, the process 200 supplies (at 220) the received user/device attributes to an MDM server set. In some embodiments, the MDM server set resides in the same branch site as the SDEN server set and the particular mobile device. In other embodiments, the MDM server set resides in a cloud site of the shared network fabric. The SDEN server set of some embodiments provides the particular mobile device's MAC address to the MDM server set in order to determine the user group to which the particular user group belongs. In other embodiments, the SDEN server set also provides the particular user's authentication credentials to determine the user group.

At 225, the process 200 receives one or more user group attributes for a particular user group to which the particular user belongs. The SDEN server set receives, from the MDM server set, an ID corresponding to the user group (e.g., the department of the corporation) to which the particular user belongs. In some embodiments, the MDM server set maintains a mapping table mapping device MAC addresses to user group IDs. For example, if the particular mobile device belonging to the particular user is part of a finance department of the corporation, the MDM server set maintains a mapping between the particular mobile device's MAC address and an ID identifying the finance department.

After receiving the one or more user group attributes, the process 200 uses (at 230) the received user group attributes to identify an SD-WAN tenant ID for the particular user group specifying a particular SD-WAN belonging to the particular user group. After receiving identification of the particular user's user group, the SDEN server set identifies the SD-WAN for the user group by identifying a tenant ID for the user group. In some embodiments, the same tenant ID is used for all users of the user group. In other embodiments, a set of tenant IDs is used for the user group such that at least two different users of the user group have their own unique tenant ID.

Lastly, the process 200 provides (at 235) the identified SD-WAN tenant ID to the managed wireless network switch to encapsulate data message flows, sent from the particular mobile device to other resources in the shared network fabric, with the SD-WAN tenant ID. After identifying the SD-WAN tenant ID for the particular user group (and, therefore, for the particular user), the SDEN server set provides it to the managed wireless network switch. The managed wireless network switch of some embodiments encapsulates each data message sent from the particular mobile device with an encapsulating header that includes the SD-WAN tenant ID so that all data message flows sent by the particular mobile device are sent through the correct SD-WAN.

In some embodiments, the managed wireless network switch stores the SD-WAN tenant ID in a local storage or memory. For example, the managed wireless network switch of some embodiments maintains, in a local storage, a mapping table that includes mappings between each mobile device it exchanges data message flows for and the tenant ID associated with each mobile device. After providing the SD-WAN tenant ID to the managed wireless network switch, the process 200 ends.

In some embodiments, a mobile device requesting access to a shared network fabric does not belong to a user group with an already established SD-WAN. In such embodiments, the SDEN server set creates a new SD-WAN tenant ID for the user group to create a new SD-WAN for the group. In other embodiments, the mobile device does not belong to any user group. In these embodiments, the MDM server set creates a new user group ID for the user and sends the new user group ID to the SDEN server set. Then, the SDEN server set creates a new SD-WAN tenant ID for the new user group ID to establish a new SD-WAN for the new user group.

In addition to dynamically associating mobile devices with different SD-WANs implemented for different user groups of a single shared network fabric of a single entity, some embodiments associate mobile devices with different virtual local area networks (VLANs) within each SD-WAN for different user subgroups of the shared network fabric in order to further segment each SD-WAN. In such embodiments, the SDEN server set receives, from the MDM server set, (1) user group attributes in order to determine the correct SD-WAN and (2) user subgroup attributes in order to determine the correct VLAN of the SD-WAN.

Using the user group attributes, the SDEN server set determines an SD-WAN tenant ID for the user group. Using the user subgroup attributes, the SDEN server set determines a VLAN tag for the user subgroup. In some embodiments, the SDEN server set also determines an Internet Protocol (IP) subnet for the user subgroup and assigns an IP address from that subnet to the mobile device. Then, the SDEN server set provides the SD-WAN tenant ID, the VLAN tag, and the assigned IP address to the managed wireless network switch for forwarding flows sent from the mobile device to other resources. In some embodiments, the managed wireless network switch places both the tenant ID and VLAN tag in a single encapsulating header of each data message sent from the mobile device. In other embodiments, the managed wireless network switch places the tenant ID and VLAN tag in separate encapsulating headers of each data message sent from the mobile device. Even as the mobile device moves to different branch sites and to different physical locations, the assigned SD-WAN tenant ID, VLAN tag, and IP subnet remains the same.

As discussed previously, different user groups of an entity (e.g., a corporation) are associated with different SD-WANs of a shared network fabric in order to isolate traffic between each user group. An SD-WAN can include any number of branch sites, datacenter sites, and cloud sites of the shared network fabric. Different SD-WANs in some embodiments include different sites located in different geographic locations. For example, a first SD-WAN for an engineering department of some embodiments includes sites in a first set of geographic locations, while a second SD-WAN for a legal department includes sites in a second set of geographic locations. The first and second sets of geographic locations in some embodiments include at least one same geographic site.

Figure 3:
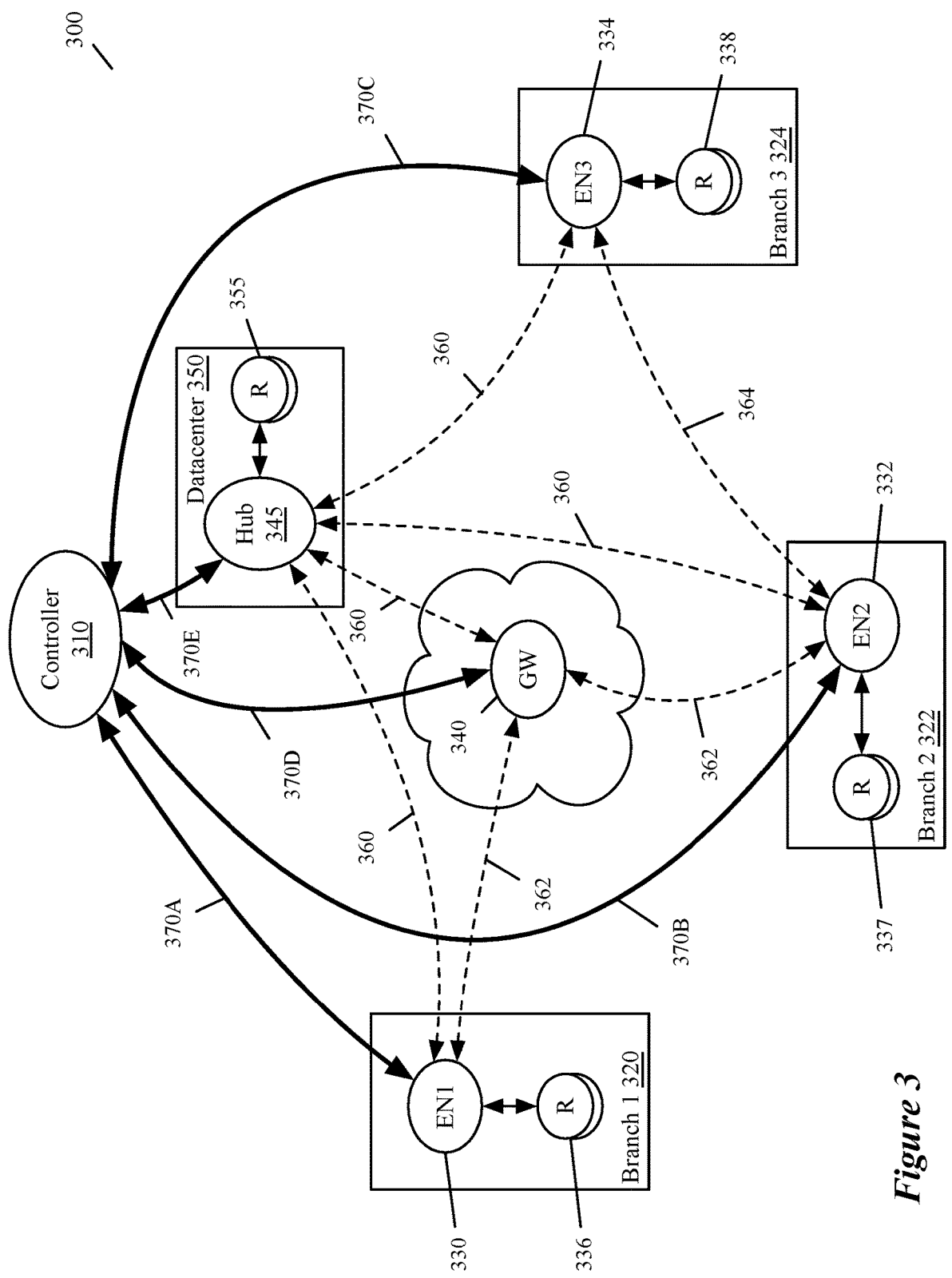
FIG. 3 illustrates an example embodiment of an SD-WAN for connecting multiple branch sites of a particular entity to each other and to a controller and at least one datacenter hub.

FIG. 3 illustrates an example embodiment of an SD-WAN 300 (also referred to herein as a virtual network) for connecting multiple branch sites of a particular entity to each other and to a controller and at least one datacenter hub. As shown, the SD-WAN 300 includes a controller 310, three branch sites 320-324 that each include an edge forwarding node 330-334 (also referred herein as edge nodes or nodes) and resources 336-338, a cloud gateway 340, and a datacenter 350 with a hub 345.

The edge nodes in some embodiments are edge machines (e.g., VMs, containers, programs executing on computers, etc.) and/or standalone appliances that operate at multi-computer locations of the particular entity (e.g., at an office or datacenter of the entity) to connect the computers at their respective locations to other nodes, hubs, etc. in the virtual network. In some embodiments, the edge nodes are clusters of nodes at each of the branch sites. In other embodiments, the edge nodes are deployed to each of the branch sites as high-availability pairs such that one edge node in the pair is the active node and the other edge node in the pair is the standby node that can take over as the active edge node in case of failover.

Each edge node 330-334 in some embodiments includes one or more of edge appliances, broadband routers, and customer edge (CE) routers. In such embodiments, each edge node includes multiple components, and connects to each other site (branch sites, 320-324, datacenter 350, and cloud gateway 340) through one or more links. These multiple links in some embodiments include LAN links connecting to resources within the branch site and/or WAN links connecting to the other sites.

In some embodiments, each edge node, hub, and cloud gateway in an SD-WAN (such as the edge nodes 330-334, the datacenter hub 345, and the cloud gateway 340 of the SD-WAN 300) includes a router that performs the data message forwarding operations of the edge node, hub, or cloud gateway. In such embodiments, the next-hop forwarding records of these edge nodes, hubs, and cloud gateways are routing records used by the routers to forward data messages through the SD-WAN.

Each edge node 330-334 in some embodiments connects to an external network through two or more forwarding devices (e.g., an MPLS (multiprotocol label switching) device, a cable modem router, a 5G router) of two or more communication service providers (e.g., a telephone company provider of an MPLS network, a cable modem provider of an ISP (Internet Service Provider), a wireless provider for the 5G connectivity). In some of these embodiments, each edge node 330-334 connects to the forwarding devices of the service providers through two or more physical ports of the edge node.

An example of an entity for which such a virtual network can be established includes a business entity (e.g., a corporation), a non-profit entity (e.g., a hospital, a research organization, etc.), an education entity (e.g., a university, a college, etc.), or any other type of entity. In some embodiments, multiple virtual networks are established for a single entity. For example, for a business entity in some embodiments, a first SD-WAN is established for an engineering department of the business entity, a second SD-WAN is established for a finance department of the business entity, a third SD-WAN is established for a legal department of the business entity, etc. In some embodiments, each of these different SD-WANs differs from each other.

For example, the first SD-WAN for the engineering department in some embodiments connects two of the business entity's branch sites and a datacenter site (i.e., the first SD-WAN includes the edge nodes of the two branch sites along with the cloud gateway and the datacenter hub), while the second SD-WAN for the finance department connects all of the business entity's branch sites and not the datacenter site (i.e., the SD-WAN includes the edge nodes of all branch sites along with the cloud gateway). In such embodiments, when a wireless device used by a particular user belonging to a particular department requests to connect to an SD-WAN of the business entity, the wireless device is placed in the correct SD-WAN corresponding to the user's particular department.

Examples of public cloud providers include Amazon Web Services® (AWS), Google Cloud Platform™ (GCP), Microsoft Azure®, etc., while examples of entities include a company (e.g., corporation, partnership, etc.), an organization (e.g., a school, a non-profit, a government entity, etc.), etc. In other embodiments, hubs like the hub 345 can also be deployed in private cloud datacenters of a virtual WAN provider that hosts hubs to establish SD-WANs for different entities.

In the example SD-WAN 300, the hub 345 is a multi-tenant forwarding element that is deployed on the premises of the datacenter 350. The hub 345 can be used to establish secure connection links (e.g., tunnels) with edge nodes at the particular entity's multi-computer sites, such as branch sites 320-324, third-party datacenters (not shown), etc. For example, the hub 345 can be used to provide access from each branch site 320-324 to each other branch site 320-324 (e.g., via the connection links 360 that terminate at the hub 345) as well as to the resources 355 of the datacenter 350. These multi-computer sites are often at different physical locations (e.g., different buildings, different cities, different states, etc.), according to some embodiments. In some embodiments, hubs can be deployed as physical nodes or virtual nodes. Additionally, hubs in some embodiments can be deployed on a cloud (e.g., as a set of virtual edges configured as a cluster).

In the SD-WAN 300, the hub 345 also provides access to the resources 355 of the datacenter 350 as mentioned above. The resources 355 in the datacenter 350 and the resources 336-338 in the branch sites 320-324 in some embodiments include a set of one or more servers (e.g., web servers, database servers, etc.) within a microservices container (e.g., a pod). Conjunctively, or alternatively, some embodiments include multiple such microservices containers, each accessible through a different set of one or more hubs of the datacenter (not shown). The resources, as well as the hubs, are within the datacenter premises, according to some embodiments. While not shown, some embodiments include multiple different Software-as-a-Service (SaaS) datacenters, which may each be accessed via different sets of hubs, according to some embodiments. In some embodiments, the SaaS datacenters include datacenters for video conferencing SaaS providers, for middlebox (e.g., firewall) service providers, for storage service providers, etc.

Additional examples of resources 355 in the datacenter 350 and resources 336-338 in the branch sites 320-324, in some embodiments, include compute machines (e.g., virtual machines and/or containers providing server operations), storage machines (e.g., database servers), and middlebox service operations (e.g., firewall services, load balancing services, encryption services, etc.). Within each branch site 320-324, edge nodes in some embodiments connect to their resources using links, which are the LANs within the branch site. In some embodiments, the connections 360 between the branch sites 320-324 and the hub 345 are secure encrypted connections that encrypt data messages exchanged between the edge nodes 330-334 of the branch sites 320-324 and the hub 345. Examples of secure encrypted connections used in some embodiments include VPN (virtual private network) connections, or secure IPsec (Internet Protocol security) connections.

In some embodiments, multiple secure connection links (e.g., multiple secure tunnels) can be established between an edge node and the hub 345. When multiple such links are defined between a node and a hub, each secure connection link, in some embodiments, is associated with a different physical network link between the node and an external network. For instance, to access external networks in some embodiments, a node has one or more commercial broadband Internet links (e.g., a cable mode and a fiber optic link) to access the Internet, a wireless cellular link (e.g., a 5G LTE network), etc. The collection of the edge nodes, gateway, datacenter hub, controller, and secure connections between the edge nodes, gateway, datacenter hub, and controller form the SD-WAN 300.

The controller 310 of some embodiments communicates with each of the nodes 330-334 at the branch sites 320-324 to assign a tenant ID to the SD-WAN 300. While illustrated as individual connection links, the links 370A-370E are sets of multiple connection links, according to some embodiments. In addition to the connection links 370A-370E and 360, edge nodes 332 and 334 are connected via connection link 364, while edge nodes 330 and 332 are connected to the gateway 340 via connection links 362. The gateway 340 in this example is responsible for relaying information between edge nodes (e.g., edge nodes 330 and 332, which do not share a direct connection). Also, the gateway 340 in some embodiments is used to set up direct edge-to-edge connections. In some embodiments, the gateway 340 can be used to provide the edge nodes with access to cloud resources (e.g., compute, storage, and service resources of a cloud datacenter).

Figure 4:
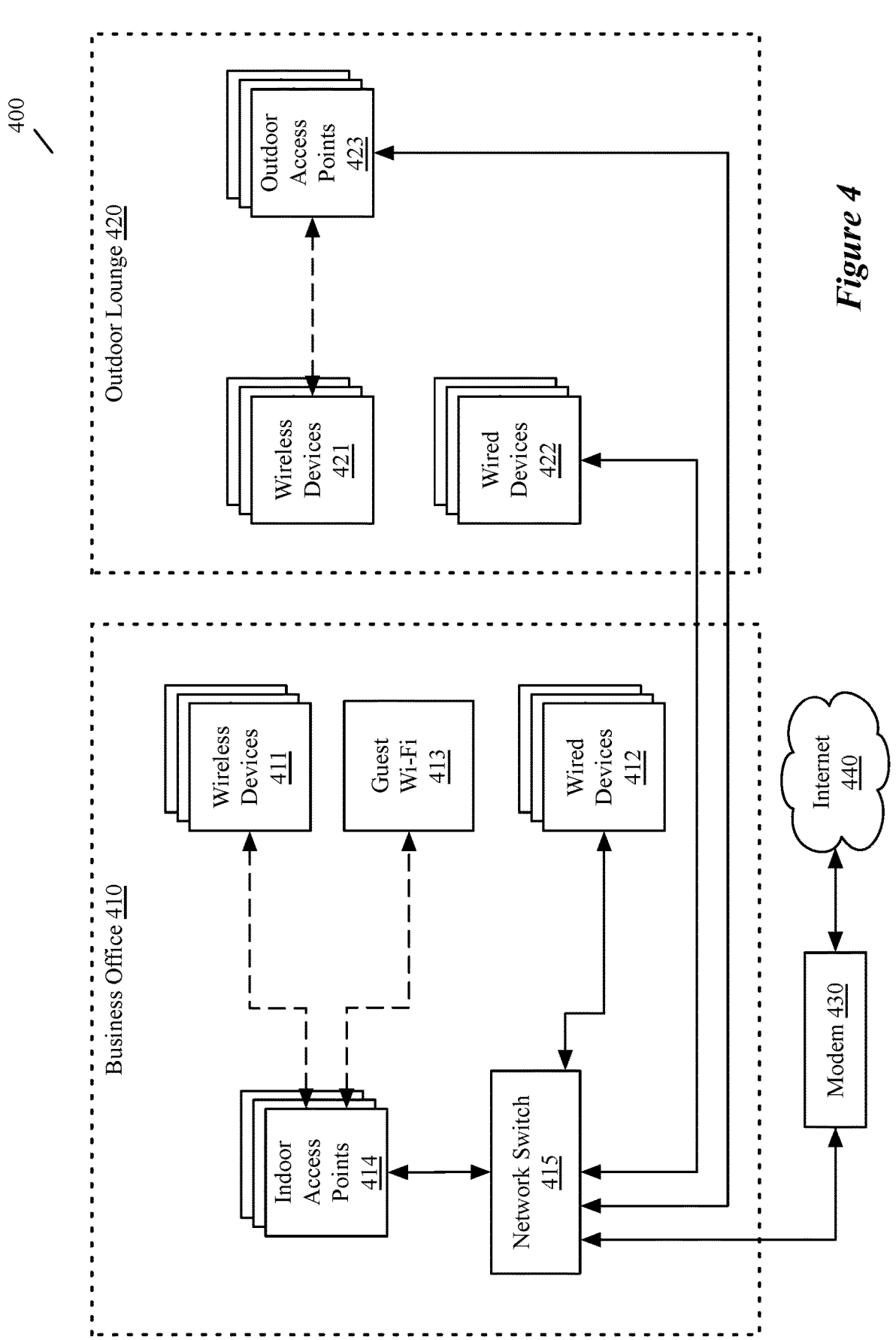
FIG. 4 illustrates a physical topology of an example branch site.

FIG. 4 illustrates an example branch office 400 and its physical components. In this example, the branch office 400 includes a business office 410 and an outdoor lounge 420. The branch office 410 includes wireless devices 411, wired devices 412, guest Wi-Fi 413, one or more indoor access points 414, and a network switch 415. The outdoor lounge 420 includes wireless devices 421, wired devices 422, and outdoor access points 423.

The wireless devices 411 and 421 in some embodiments include wireless mobile devices of users in the branch office 400, such as laptops, mobile phones, tablets, etc. The wireless devices 411 and 421 also include, in some embodiments, shared wireless devices, such as a thermostat for the business office 410. In some embodiments, the wired devices 412 inside the business office 410 include devices used by individual users in the branch office 400, such as desktop computers. The wired devices 412 in some embodiments include wired devices used by one or more users inside the business office 410, such as servers, printers, televisions, projectors, and desk phones. The wired devices 422 in the outdoor lounge 420 in some embodiments include wired devices used by one or more users in the outdoor lounge 420, such as security cameras.

The wireless devices 411 inside the business office 410 connect to one or more indoor access points 414. In some embodiments, all wireless devices 411 connect to the same indoor access point. In other embodiments, a first subset of the wireless devices 411 connect to a first indoor access point, while a second subset of the wireless devices 411 connect to a second indoor access point. The guest Wi-Fi 413 also connects to one of the indoor access points 414. By connecting to the indoor access points 414, the wireless devices 411 and guest Wi-Fi 413 can communicate with the network switch 415.

The wired devices 412 of some embodiments connect directly to the network switch 415. The network switch 415 connects to a modem 430 in order to connect to the Internet 440. The network switch 415 allows the wireless devices 411, wired devices 412, and guest Wi-Fi 413 to exchange data message flows with other branch sites through the Internet 440.

The wireless devices 421 out in the outdoor lounge 420 connect to one or more outdoor access points 423. In some embodiments, all wireless devices 421 connect to the same outdoor access point. In other embodiments, a first subset of the wireless devices 421 connect to a first outdoor access point, while a second subset of the wireless devices 421 connect to a second outdoor access point. By connecting to the outdoor access points 423, the wireless devices 421 can communicate with the network switch 415. The wired devices 422 of some embodiments connect directly to the network switch 415. The network switch 415 allows the wireless devices 421 and wired devices 422 to exchange data message flows with other branch sites through the Internet 440.

All of the wireless devices 411 and 421 and the wired devices 412 and 422 are in some embodiments part of one or more SD-WANs established for the branch office's entity. For instance, a first wireless device of the business office wireless devices 411 is in some embodiments part of a first SD-WAN, while a second wireless device of the business office wireless devices 411 is part of a second SD-WAN. While both devices reside in the same physical location (i.e., the same branch site 400), they may be in different virtual networks based on the identity of the user using that device.

Figure 5:
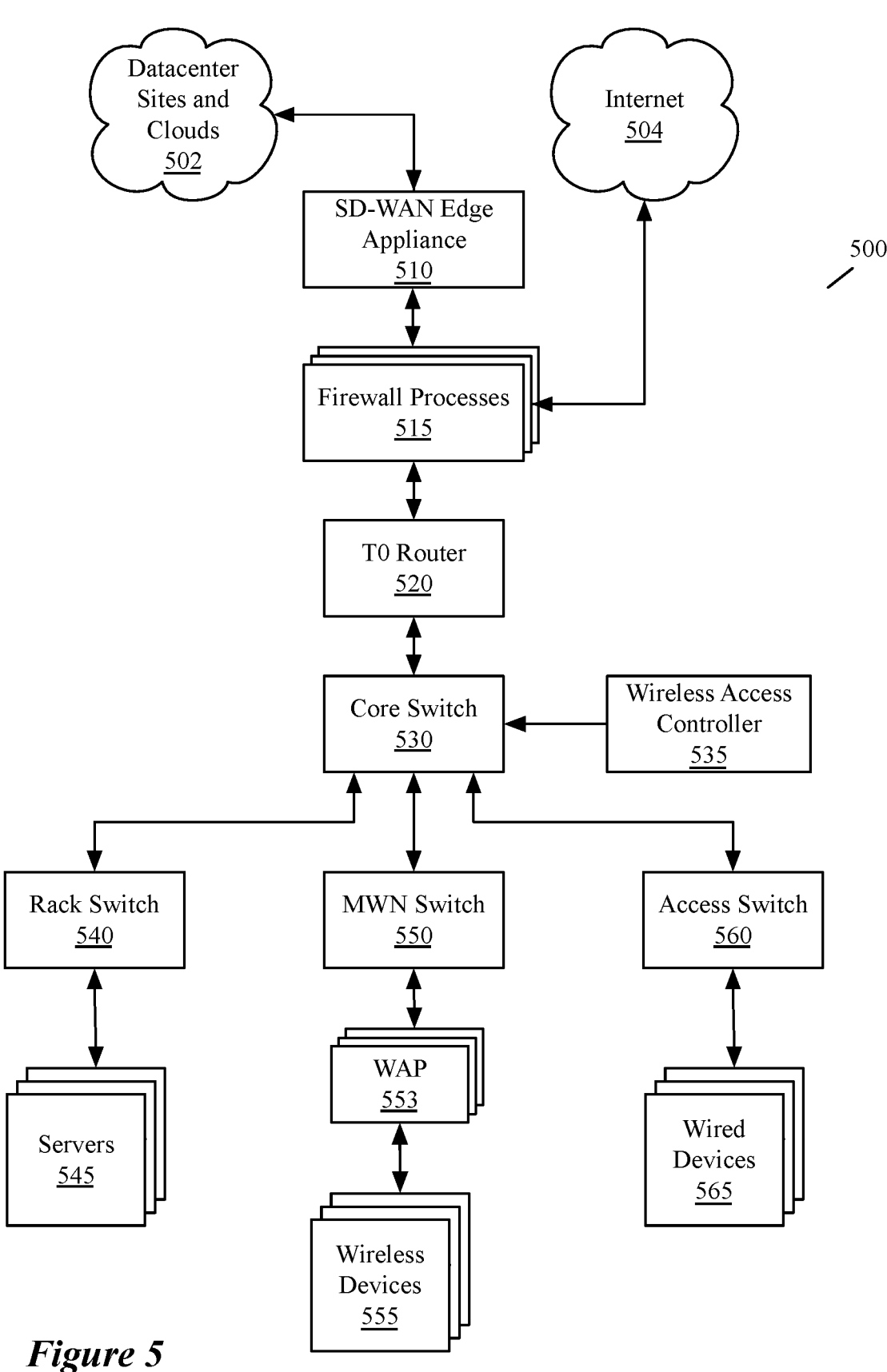
FIG. 5 illustrates a more detailed physical topology of an example branch site.

FIG. 5 illustrates another example branch site 500 with a more detailed physical topology. In this example, the branch site 500 communicates with one or more datacenter sites and one or more cloud sites 502 through an SD-WAN edge appliance 510. In some embodiments, the SD-WAN edge appliance 510 operates as a standalone computer. In other embodiments, it runs as a software edge node on a host computer in the branch site 500. In some embodiments, the SD-WAN edge appliance 510 includes a router that performs the data message forwarding operations of the SD-WAN edge appliance. In such embodiments, the next-hop forwarding records of the SD-WAN edge appliance 510 are routing records used by the router to forward data messages to the datacenter sites and clouds 502.

In some embodiments, the SD-WAN edge appliance 510 includes two or more edge devices, with each edge device connected to the datacenter sites and clouds 502 through different communication service providers (e.g., an MPLS device, a cable modem router, a 5G router, etc.). In some of these embodiments, the edge devices of the SD-WAN edge appliance 510 connect to each other using a physical cable link.

The branch site 500 also communicates with the Internet 504. Data message flows received from the datacenter sites and cloud sites 502 (through the SD-WAN edge appliance 510) and the Internet 504 are sent through one or more firewall processes 515. In some embodiments, one or more cloud sites 502 include one or more MDM servers (not shown) for use by the branch site 500.

After being processed by the firewall processes 515, allowed data message flows are sent to a Tier-0 (T0) router 520 of the branch site 500, and then to a core switch 530. The core switch 530 is connected to a wireless access controller 535. In some embodiments, the wireless access controller 535 configures the WAP 553 and controls policies used by the WAP 553. In such embodiments, the wireless access controller 535 sends WAP policies to the WAP 553 through the core switch 530. Any number of WAPs may execute in the branch site 500.

The core switch 530 connects to a rack switch 540, a managed wireless network switch 550, and an access switch 560 that connect to different types of endpoints in the branch site 500 and are configured by SDN servers (e.g., SDN managers and controllers) (not shown) operating at the branch site 500. The rack switch 540 connects to one or more servers 545. The managed wireless network switch 550 connects to a WAP 553, which provides communication between the managed wireless network switch 550 and wireless devices 555 at the branch site 500. The access switch 560 is a managed wired network switch (i.e., a switch that is managed by a set of SDN managers and controllers and that has physical ports for receiving Ethernet cables) that connects to the wired devices 565 at the branch site 500. The core switch 530 enables all endpoints 545, 555, and 565 to exchange data message flows with each other and with resources outside the branch site 500 (e.g., resources residing at the datacenter sites and clouds 502 and resources reachable over the Internet 504).

All of the wireless devices 555 and the wired devices 565 are in some embodiments part of one or more SD-WANs established for the branch office's entity. For instance, a first wireless device is in some embodiments part of a first SD-WAN, while a second wireless device is part of a second SD-WAN. While both devices reside in the same physical location (i.e., the same branch site 500), they may be in different virtual networks based on the identity of the user using that device.

Figure 6:
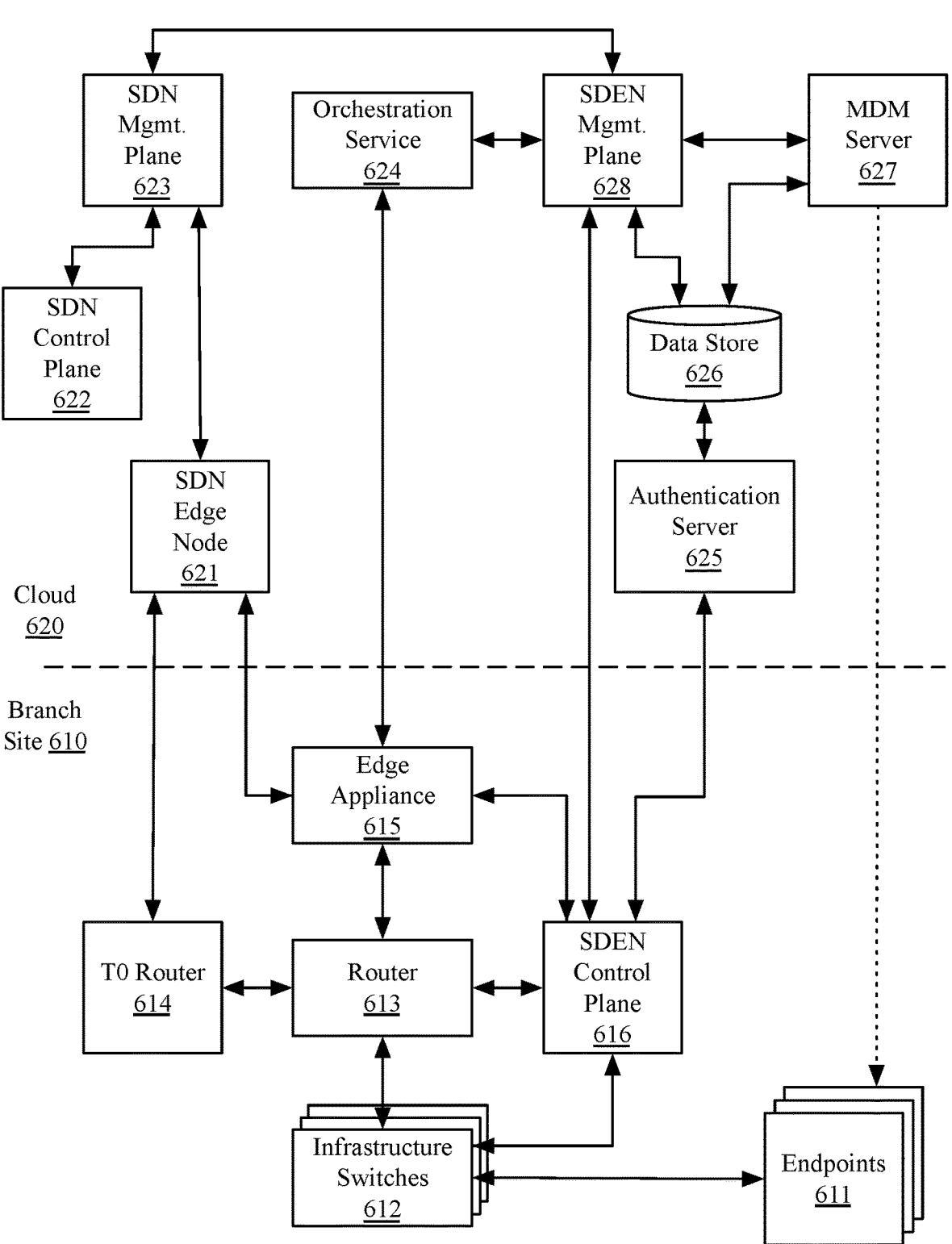
FIG. 6 illustrates a logical topology for implementing a branch site in some embodiments.

FIG. 6 illustrates a logical topology for implementing a branch site in some embodiments. In this example, a branch site 610 includes a set of one or more endpoints 611, a set of one or more infrastructure switches 612, a router 613, a T0 router 614, an edge appliance 615, and an SDEN control plane 616. A cloud 620 includes an SDN edge node 621, an SDN control plane 622, an SDN management plane 623, an orchestration service 624, an authentication server 625, a data store 626, an MDM server 627, and an SDEN management plane 628.

In the branch site 610, the endpoints 611 include one or more of wireless devices and wired devices used by users in the branch site 610 (e.g., employees of the corporation at the branch site location). The endpoints 611 connect to the infrastructure switches 612. The infrastructure switches 612 are in some embodiments a set of managed switches configured by SDN servers (e.g., SDN managers and controllers) (not shown) operating at the branch site 610. The infrastructure switches 612 include in some embodiments, an MWN switch (e.g., through a secure WAP), a rack switch, an access switch (i.e., a managed wired network switch), and/or a core switch (such as the switches 530, 540, 550, and 560 in FIG. 5). In some embodiments, the endpoints 611 are placed in an SD-WAN based on the endpoint's MAC address and/or the user's group identity (e.g., the user's responsibility and role within the corporation). User group identities are maintained by the MDM server 627 in the cloud.

The infrastructure switches 612 communicate with the SDEN control plane 616, which includes a cluster of one or more SDEN controllers for dynamically associating the endpoints 611 with different SD-WANs implemented for different user groups. For instance, an MWN switch of the infrastructure switches 612 in some embodiments requests the SDEN control plane 616 to retrieve MDM attributes (e.g., SD-WAN tenant IDs) from the MDM server 627 in the cloud 620. The SDEN control plane 616 provides the MDM attributes to the MWN switch for the MWN switch to embed them (e.g., encapsulate) them onto data message flows sent by wireless devices of the endpoints 611. As another example, an access switch (e.g., a managed wired network switch) of the infrastructure switches 612 in some embodiments requests the SDEN control plane 616 to retrieve MDM attributes (e.g., SD-WAN tenant IDs) from the MDM server 627 in the cloud 620. The SDEN control plane 616 provides the MDM attributes to the access switch for the access switch to embed them (e.g., encapsulate) them onto data message flows sent by wired devices of the endpoints 611.

In some embodiments, the SDEN control plane 616 allows for communications between the MDM server 627 and the SDN components 621-623. The SDEN control plane 616 communicates with the authentication server 625 in the cloud 620 to authenticate a user of one or more endpoints 611. The SDEN control plane 616 and authentication server 625 in some embodiments operate similarly to the SDEN servers 175 and authentication server 180 of FIG. 1, respectively.

The authentication server 625 uses user identity information stored in the data store 626 to authenticate a user. In some embodiments, the data store 626 is a directory server (e.g., an Active Directory (AD) offered by Microsoft® Corporation) that stores directory service information, such as user and device information. The data store 626 is in some embodiments a centralized and hierarchical database. The authentication server 625 of some embodiments uses a protocol (e.g., Lightweight Directory Access Protocol (LDAP)) to access the data store 626.

The SDEN control plane 616 is managed by the SDEN management plane 628 residing in the cloud 620. In some embodiments, the SDEN management plane 628 includes a cluster of one or more management servers that manage the SDEN control plane 616 based on configuration data received from a network administrator. In some embodiments, the SDEN management plane 628 also manages the data store 626 and the MDM server 627. In the cloud 620, the SDN management plane 623 manages the SDN control plane 622 and the SDN edge node 621.

The infrastructure switches 612 also communicate with the router 613 in some embodiments. For instance, a core switch of the infrastructure switches 612 in some embodiments communicates directly with the router 613 for an MWN switch, rack switch, and access switch to communicate with the router 613. The router 613 connects to the edge appliance 615 to connect to the orchestration service 624. This connection provides a way for implementing multiple SD-WANs using the SDEN control plane 616 in the branch site 610 and the SDEN management plane 628 in the cloud 620. Further information regarding this connection will be described below. The edge appliance 615 is in some embodiments one part of an edge node (e.g., edge nodes 330-334)

along with CE routers and/or broadband routers that use routing records to forward data messages to the cloud 520.

In some embodiments, the edge appliance 615 also connects to the SDN edge node 621 using a secure connection (e.g., a tunnel). While the edge appliance 615 is shown in this figure as connecting to components in a cloud site 620, in other embodiments, the edge appliance 615 connects to other edge nodes (e.g., edge appliances, T0 routers, etc.) in other branch sites, hub nodes in datacenter sites, and cloud gateways in other cloud sites.

In some embodiments, the router 613 connects to a T0 router 614 for implementing multiple logical networks. For instance, once the SDEN control plane 616 uses the MDM server 627 to identify which group to associate a particular endpoint 611. Using this information, the SDEN control plane 616 notifies the SDEN management plane 628 that the particular endpoint 611 needs logical network access to the cloud 620, so the SDEN management plane 628 relays this to the SDN management plane 623.

The SDN management plane 623 uses the SDN control plane 622 and the SDN edge node 621 to create a logical network connection (e.g., a secure channel, a tunnel (such as a Geneve tunnel)) between the SDN edge node 621 and the T0 router 614 at the branch site 610. In such embodiments, the branch site 610 communicates with the cloud 620 using this connection instead of communicating between the edge appliance 615 and the orchestration service 624. Although the T0 router 614 is illustrated here as communicating via a tunnel with an SDN edge node 621 in a cloud site 620, the T0 router 614 in other embodiments connect to other T0 routers or edge nodes in other branch sites, to bun nodes in datacenter sites, and to cloud gateways in cloud sites. These connections are in some embodiments established using tunnels (like the connection between the T0 router 614 and the SDN edge node 621) between the T0 router 614 and the other edge nodes, hub nodes, and cloud gateways in other sites.

In some embodiments, the SDEN management plane 628 and the SDN management plane 623 are implemented as a single management plane in the cloud 620. Further information regarding this connection will be described below.

Figure 7:
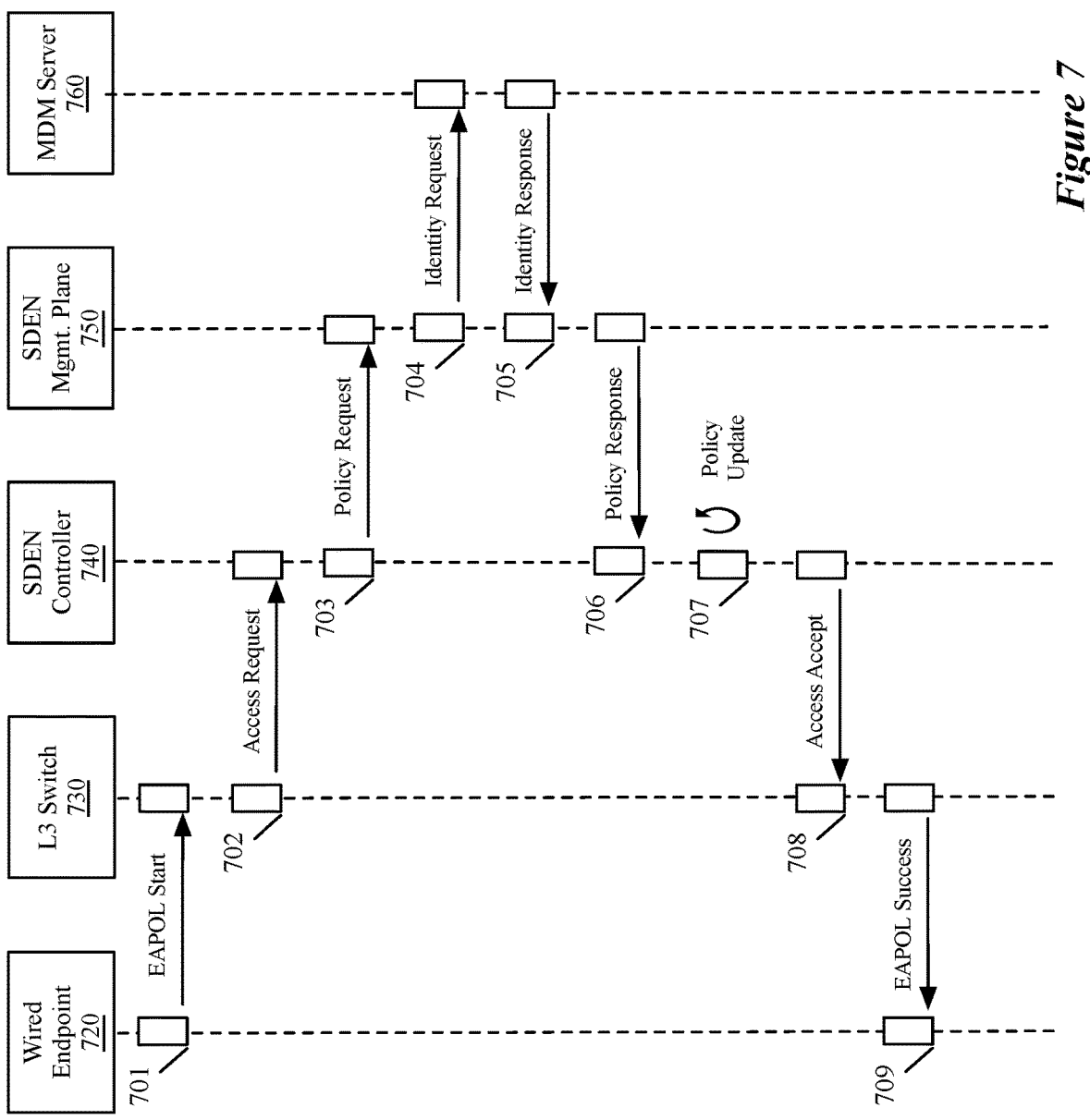
FIG. 7 illustrates communication for a branch site for wired devices.

As described above, endpoints 611 of a branch site 610 can connect to an entity's shared network fabric using components residing in a cloud 620. In some embodiments, wired endpoints and wireless endpoints connect differently. Both scenarios will be further described below using specific examples. One of ordinary skill would understand that the flow of components described below is only an example way for the components to interact. Other permutations may be performed. FIG. 7 illustrates the communication between a wired endpoint 720, a layer 3 (L3) switch 730, an SDEN controller cluster 740, an SDEN management plane 750, and an MDM server set 760 for connecting the wired endpoint 720 residing in a branch site to a shared network fabric.

At 701, the wired endpoint 720 sends an Extensible Authentication Protocol (EAPOL) start request to the L3 switch 730. In some embodiments, the L3 switch 730 is a core switch of the branch site that the endpoint 720 accesses through an access switch (e.g., a managed wired network switch). The EAPOL start request is sent by the wired endpoint 720 when it wants to request access to the shared network fabric but does not know the MAC address of the authenticator (i.e., the SDEN controller cluster 740 in this example). After receiving the EAPOL start request, at 702, the L3 switch 730 provides an access request for the endpoint 720 to the SDEN controller cluster 740. In some embodiments, the SDEN controller cluster 740 is a set of one or more controllers operating as the SDEN control plane at the same branch site as the wired endpoint 720. The access request in some embodiments includes a set of attributes related to the wired endpoint 720 and/or the user using the endpoint. For instance, the set of attributes can include a MAC address of the endpoint 720 and a set of credentials (e.g., a username and password) for the user.

After receiving the access request, at 703, the SDEN controller cluster 740 sends a network policy request to the SDEN management plane 750. The SDEN management plane 750 of some embodiments resides in a cloud of the shared network fabric (such as the SDEN management plane 628 of FIG. 6). The policy request in some embodiments requests a policy related to the virtual network to which the wired endpoint 720 belongs. In some embodiments, the SDEN controller cluster 740 includes the MAC address of the wired endpoint 720 in the policy request.

At 704, the SDEN management plane 750 sends an identity request to the MDM server set 760. The MDM server set 760 resides in the cloud along with the SDEN management plane 750. In some embodiments, the identity request includes the MAC address of the wired endpoint 720 for the MDM server set 760 to determine which group the endpoint belongs. In other embodiments, the identity request includes the user's credentials for the MDM server set 760 to determine which group the user belongs. Still, in other embodiments, the identity request includes both the endpoint's MAC address and the user's credentials for the MDM server set 760 to determine which group the user and the endpoint belong.

At 705, the MDM server set 760 provides an identity response to the SDEN management plane 750. In some embodiments, the identity response includes a group ID specifying the user and/or endpoint's group. After receiving the identity response, at 706, the SDEN management plane 750 uses the group ID to determine the network policy for the wired endpoint 720, and provides the network policy to the SDEN controller 740.

Using the received network policy, at 707, the SDEN controller cluster 740 updates the network policy. For example, the SDEN controller cluster 740 of some embodiments, updates a mapping between the endpoint's MAC address and an SD-WAN tenant ID associated with the received group ID. The SDEN controller cluster 740 of some embodiments also updates an access control list (ACL) and/or a Quality-of-Service (QOS) associated with the network policy.

At 708, the SDEN controller cluster 740 sends an access accept message to the L3 switch 730 to notify that the endpoint's access request has been accepted. In some embodiments, the SDEN controller cluster 740 also provides an ACL and/or QoS update to the L3 switch 730. Lastly, at 709, the L3 switch 730 sends an EAPOL success message to the wired endpoint 720. After this message has been sent, the wired endpoint 720 is able to connect to the shared network fabric using the correct virtual network with which it is associated.

Figure 8:
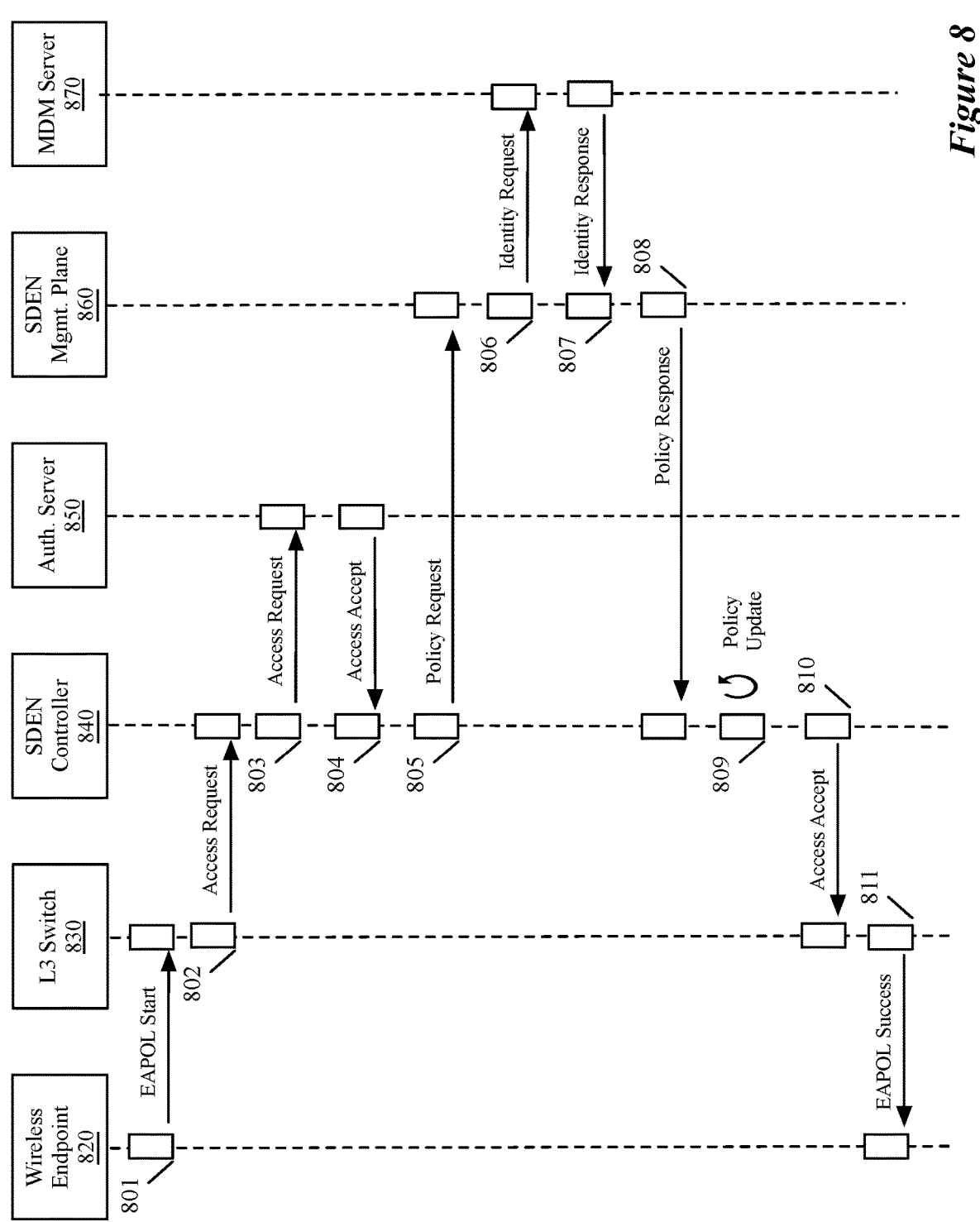
FIG. 8 illustrates communication for a branch site for wireless devices.

In some embodiments, wireless endpoints connect to the shared network fabric differently than wired endpoints. FIG. 8 illustrates the communication between a wireless endpoint 820, an L3 switch 830, an SDEN controller cluster 840, an authentication server 850, an SDEN management plane 860, and an MDM server set 870 for connecting the wireless endpoint 820 residing in a branch site to a shared network fabric.

At 801, the wireless endpoint 820 sends an EAPOL start request to the L3 switch 830. In some embodiments, the L3 switch 830 is a core switch of the branch site that the endpoint 820 accesses through a WAP and a managed wireless network switch. The EAPOL start request is sent by the wireless endpoint 820 when it wants to request access to the shared network fabric but does not know the MAC address of the authenticator (i.e., the authentication server 850 in this example). After receiving the EAPOL start request, at 802, the L3 switch 830 provides an access request for the endpoint 820 to the SDEN controller cluster 840. In some embodiments, the SDEN controller cluster 840 is a set of one or more controllers operating as the SDEN control plane at the same branch site as the wireless endpoint 820. The access request in some embodiments includes a set of attributes related to the wireless endpoint 820 and/or the user using the endpoint. For instance, the set of attributes can include a MAC address of the endpoint 820 and a set of credentials (e.g., a username and password) for the user.

At 803, the SDEN controller cluster 840 sends an access request to the authentication server 850. In some embodiments, the authentication server 850 resides in a cloud site of the shared network fabric (such as the authentication server 625 of FIG. 6). In other embodiments, it resides in the same branch site as the wireless endpoint 820 and the SDEN controller cluster 840. The access request of some embodiments includes the user's set of credentials for the authentication server 850 to authenticate. In other embodiments, it also includes the endpoint's MAC address because the authentication server 850 has to authenticate not only the user but the endpoint 820 used by the user as well. Once the authentication server 850 has authenticated the user/endpoint, at 804, it sends an access accept message to the SDEN controller cluster 840.

After receiving the access accept message, at 805, the SDEN controller cluster 840 sends a network policy request to the SDEN management plane 860. The SDEN management plane 860 of some embodiments resides in a cloud along with the authentication server 850 (such as the SDEN management plane 628 of FIG. 6). The policy request in some embodiments requests a policy related to the virtual network to which the wireless endpoint 820 belongs. In some embodiments, the SDEN controller cluster 840 includes the MAC address of the wireless endpoint 820 in the policy request.

At 806, the SDEN management plane 860 sends an identity request to the MDM server set 870. The MDM server set 870 resides in the cloud along with the SDEN management plane 860 and the authentication server 850. In some embodiments, the identity request includes the MAC address of the wireless endpoint 820 for the MDM server set 870 to determine which group the endpoint belongs. In other embodiments, the identity request includes the user's credentials for the MDM server set 870 to determine which group the user belongs. Still, in other embodiments, the identity request includes both the endpoint's MAC address and the user's credentials for the MDM server set 870 to determine which group the user and the endpoint belong.

At 807, the MDM server set 870 provides an identity response to the SDEN management plane 860. In some embodiments, the identity response includes a group ID specifying the user and/or endpoint's group. After receiving the identity response, at 808, the SDEN management plane 860 uses the group ID to determine the network policy for the wireless endpoint 820, and provides the network policy to the SDEN controller cluster 840.

Using the received network policy, at 809, the SDEN controller cluster 840 updates the network policy. For example, the SDEN controller cluster 840 of some embodiments, updates a mapping between the endpoint's MAC address and an SD-WAN tenant ID associated with the received group ID. The SDEN controller cluster 840 of some embodiments also updates an ACL and/or a QoS associated with the network policy.

At 810, the SDEN controller cluster 840 sends an access accept message to the L3 switch 830 to notify that the endpoint's access request has been accepted. In some embodiments, the SDEN controller cluster 840 also provides an ACL and/or QoS update to the L3 switch 830. Lastly, at 811, the L3 switch 830 sends an EAPOL success message to the wireless endpoint 820. After this message has been sent, the wireless endpoint 820 is able to connect to the shared network fabric using the correct virtual network with which it is associated.

Figure 9:
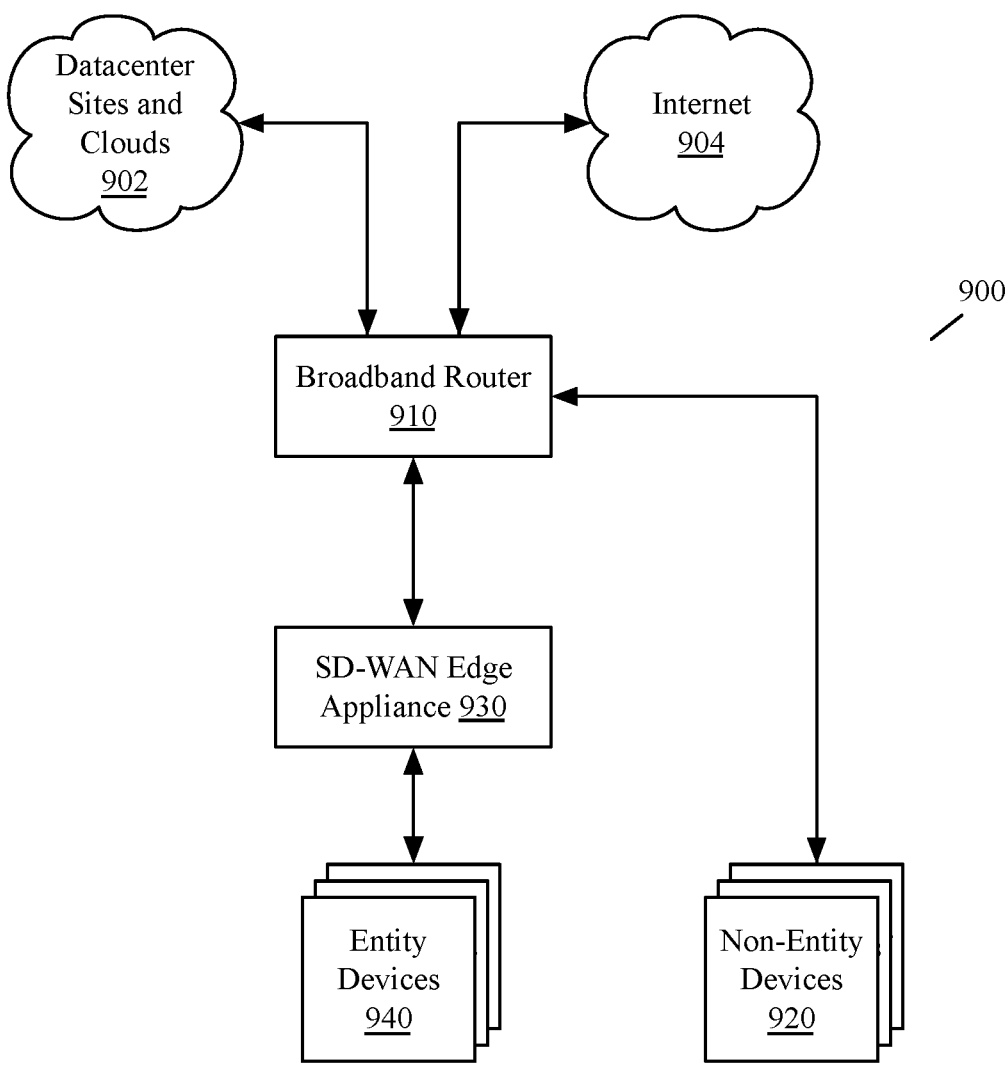
FIG. 9 illustrates a detailed physical topology of an example remote site.

In some embodiments, a simpler branch site or a home office of the shared network fabric does not include many of the same components as a larger branch site (such as the branch site 500 of FIG. 5). FIG. 9 illustrates a physical topology of an example remote site 900. In some embodiments, the remote site 900 is a branch site of an entity. In other embodiments, it is a home office used by one or more users of the entity.

In this example, the remote site 900 communicates with one or more datacenter sites and one or more cloud sites 902 through a broadband router 910. In some embodiments, the broadband router 910 is a standalone physical router or customer premises equipment (CPE) to connect to other resources in other sites or the Internet 904. In other embodiments, it is a software router executing on a host computer in the remote site 900. The remote site 900 also communicates with the Internet 904. In some embodiments, one or more cloud sites 902 include one or more MDM servers (not shown) for use by the remote site 900.

The broadband router 910 of some embodiments connects directly to non-entity devices 920 residing in the remote site 900. Non-entity devices 920 in some embodiments include wired and/or wireless personal devices of the user (i.e., not authorized for use of the datacenter sites and clouds 902 by the user) or devices of non-users at the remote site 900 (e.g., guests or family members of the user). The broadband router 910 connects to an SD-WAN edge appliance 930 in the remote site 900. In some embodiments, the SD-WAN edge appliance 930 operates as a standalone computer. In other embodiments, it runs as a software edge node on a host computer in the remote site 900.

In some embodiments, the SD-WAN edge appliance 930 includes a router that performs the data message forwarding operations of the SD-WAN edge appliance. In such embodiments, the next-hop forwarding records of the SD-WAN edge appliance 930 are routing records used by the router to forward data messages to the datacenter sites and clouds 902.

In some embodiments, the SD-WAN edge appliance 930 includes two or more edge devices, with each edge device connected to the datacenter sites and clouds 902 through different communication service providers (e.g., an MPLS device, a cable modem router, a 5G router, etc.). In some of these embodiments, the edge devices of the SD-WAN edge appliance 930 connect to each other using a physical cable link.

The SD-WAN edge appliance 930 connects to entity devices 940 residing in the remote site 900. Entity devices 940 in some embodiments include wired and/or wireless devices that are authorized to access the datacenter sites and cloud sites 902 of the entity. For example, work-designated devices of an employee of a corporation are entity devices.

The entity devices 940 are in some embodiments part of one or more SD-WANs established for the remote office's entity. For instance, a first entity device is in some embodiments part of a first SD-WAN, while a second entity device is part of a second SD-WAN. While both devices reside in the same physical location (i.e., the same remote site 900), they may be in different virtual networks based on the identity of the user using that device. In some embodiments, non-entity devices 920 are also part of one or more SD-WANs established for the remote office's entity. For example, the entity of some embodiments includes one or more SD-WANs for devices not belonging to the entity in order to isolate entity traffic from non-entity traffic.

Figure 10:
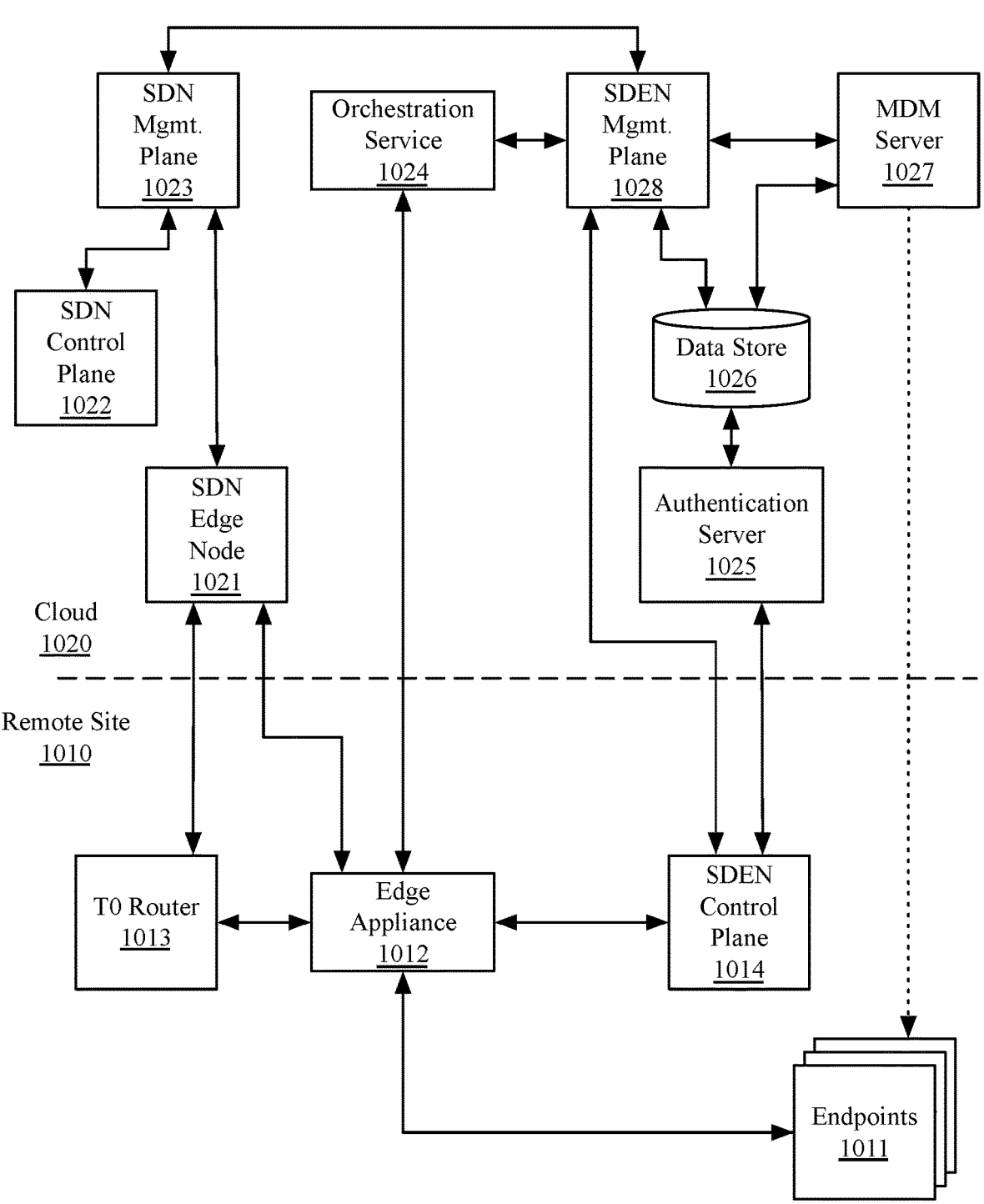
FIG. 10 illustrates a logical topology for implementing a remote site in some embodiments.

FIG. 10 illustrates a logical topology for implementing a remote site in some embodiments. In this example, a remote site 1010 includes a set of one or more endpoints 1011, an SD-WAN edge appliance 1012, a T0 router 1013, and an SDEN control plane 1014. A cloud 1020 includes an SDN edge node 1021, an SDN control plane 1022, an SDN management plane 1023, an orchestration service 1024, an authentication server 1025, a data store 1026, an MDM server 1027, and an SDEN management plane 1028.

In the remote site 1010, the endpoints 1011 include one or more of wired devices and wireless devices used by users in the remote site 1010. The endpoints 1011 connect to the edge appliance 1012. In some embodiments, the endpoints 1011 are placed in an SD-WAN based on the endpoint's MAC address and/or the user's group identity (e.g., the user's responsibility and role within the corporation). User group identities are maintained by the MDM server 1027 in the cloud 1020.

The edge appliance 1012 communicates with the SDEN control plane 1014, which includes a cluster of one or more SDEN controllers for dynamically associating the endpoints 1011 with different SD-WANs implemented for different user groups. In some embodiments, the SDEN control plane 1014 allows for communications between the MDM server 1027 and the SDN components 1021-1023. The SDEN control plane 1014 communicates with the authentication server 1025 in the cloud 1020 to authenticate a user of one or more endpoints 1011. The SDEN control plane 1014 and authentication server 1025 in some embodiments operate similarly to the SDEN servers 175 and authentication server 180 of FIG. 1, respectively.

The authentication server 1025 uses user identity information stored in the data store 1026 to authenticate a user. In some embodiments, the data store 1026 is a directory server (e.g., an AD offered by Microsoft® Corporation) that stores directory service information, such as user and device information. The data store 1026 is in some embodiments a centralized and hierarchical database. The authentication server 1025 of some embodiments uses a protocol (e.g., (LDAP) to access the data store 1026.

The SDEN control plane 1014 is managed by the SDEN management plane 1028 residing in the cloud 1020. In some embodiments, the SDEN management plane 1028 includes a cluster of one or more management servers that manage the SDEN control plane 1014 based on configuration data received from a network administrator. In some embodiments, the SDEN management plane 1028 also manages the data store 1026 and the MDM server 1027. In the cloud 1020, the SDN management plane 1023 manages the SDN control plane 1022 and the SDN edge node 1021.

The edge appliance 1012 also connects to the orchestration service 1024. This connection provides a way for implementing multiple SD-WANs using the SDEN control plane 1014 in the remote site 1010 and the SDEN management plane 1028 in the cloud 1020. Further information regarding this connection will be described below.

In some embodiments, the edge appliance 1012 includes a router that performs the data message forwarding operations of the edge appliance. In such embodiments, the next-hop forwarding records of the edge appliance 1012 are routing records used by the router to forward data messages to the cloud 1020.

In some embodiments, the edge appliance 1012 includes two or more edge devices, with each edge device connected to the cloud 1020 through different communication service providers (e.g., an MPLS device, a cable modem router, a 5G router, etc.). In some of these embodiments, the edge devices of the edge appliance 1012 connect to each other using a physical cable link.

In some embodiments, the edge appliance 1012 connects to a T0 router 1013 for implementing multiple logical networks. For instance, once the SDEN control plane 1014 uses the MDM server 1027 to identify which group to associate a particular endpoint 1011. Using this information, the SDEN control plane 1014 notifies the SDEN management plane 1028 that the particular endpoint 1011 needs logical network access to the cloud 1020, so the SDEN management plane 1028 relays this to the SDN management plane 1023.

The SDN management plane 1023 uses the SDN control plane 1022 and the SDN edge node 1021 to create a logical network connection (e.g., a secure channel, a tunnel (such as a Geneve tunnel)) between the SDN edge node 1021 and the T0 router 1013 at the remote site 1010. In such embodiments, the remote site 1010 communicates with the cloud using this connection instead of communicating between the edge appliance 1012 and the orchestration service 1024. In some of these embodiments, the SDEN management plane 1028 and the SDN management plane 1023 are implemented as a single management plane in the cloud 1020. Further information regarding this connection will be described below.

Figure 11:
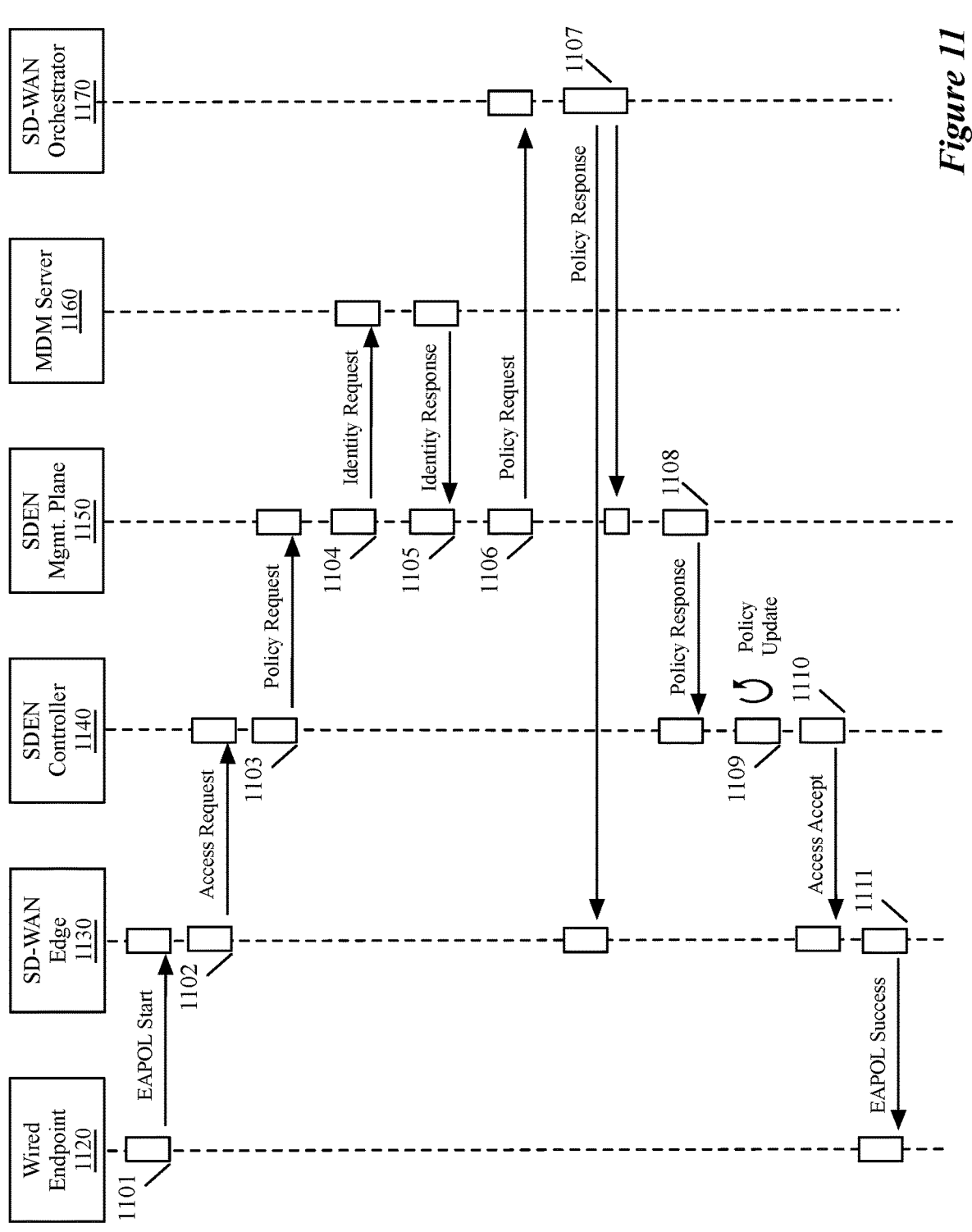
FIG. 11 illustrates communication for a remote site for wired devices.

As described above, endpoints 1011 of a remote site 1010 can connect to an entity's shared network fabric using components residing in a cloud 1020. In some embodiments, wired endpoints and wireless endpoints of a remote site connect differently. Both scenarios will be further described below using specific examples. One of ordinary skill would understand that the flow of components described below is only an example way for the components to interact. Other permutations may be performed. FIG. 11 illustrates the communication between a wired endpoint 1120, an SD-WAN edge appliance 1130, an SDEN controller cluster 1140, an SDEN management plane 1150, an MDM server set 1160, and an SD-WAN orchestrator 1170 for connecting the wired endpoint 1120 residing in a remote site (e.g., a home office) to a shared network fabric.

At 1101, the wired endpoint 1120 sends an EAPOL start request to the SD-WAN edge appliance 1130. The EAPOL start request is sent by the wired endpoint 1120 when it wants to request access to the shared network fabric but does not know the MAC address of the authenticator (i.e., the SDEN controller cluster 1140 in this example). After receiving the EAPOL start request, at 1102, the SD-WAN edge appliance 1130 provides an access request for the endpoint 1120 to the SDEN controller cluster 1140. In some embodiments, the SDEN controller cluster 1140 is a set of one or more controllers operating as the SDEN control plane at the same branch site as the wired endpoint 1120. The access request in some embodiments includes a set of attributes related to the wired endpoint 1120 and/or the user using the endpoint. For instance, the set of attributes can include a MAC address of the endpoint 1120 and a set of credentials (e.g., a username and password) for the user.

After receiving the access request, at 1103, the SDEN controller cluster 1140 sends a network policy request to the SDEN management plane 1150. The SDEN management plane 1150 of some embodiments resides in a cloud of the shared network fabric (such as the SDEN management plane 1028 of FIG. 10). The policy request in some embodiments requests a policy related to the virtual network to which the wired endpoint 1120 belongs. In some embodiments, the SDEN controller cluster 1140 includes the MAC address of the wired endpoint 1120 in the policy request.

At 1104, the SDEN management plane 1150 sends an identity request to the MDM server set 1160. The MDM server set 1160 resides in the cloud along with the SDEN management plane 1150. In some embodiments, the identity request includes the MAC address of the wired endpoint 1120 for the MDM server set 1160 to determine which group the endpoint belongs. In other embodiments, the identity request includes the user's credentials for the MDM server set 1160 to determine which group the user belongs. Still, in other embodiments, the identity request includes both the endpoint's MAC address and the user's credentials for the MDM server set 1160 to determine which group the user and the endpoint belong.

At 1105, the MDM server set 1160 provides an identity response to the SDEN management plane 1150. In some embodiments, the identity response includes a group ID specifying the user and/or endpoint's group. After receiving the identity response, at 1106, the SDEN management plane 1150 provides the policy request to the SD-WAN orchestrator 1170. The SD-WAN orchestrator 1170 of some embodiments resides in a cloud of the shared network fabric along with the SDEN management plane 1150. In some embodiments, the policy request sent at 1106 includes the group ID determined by the MDM server set 1160. At 1107, the SD-WAN orchestrator 1170 determines the network policy for the endpoint 1120 and provides a policy response to the SDEN management plane 1150 and the SD-WAN edge appliance 1130.

At 1108, the SDEN management plane 1150 provides the policy response to the SDEN controller cluster 1140. Using the received network policy, at 1109, the SDEN controller cluster 1140 updates the network policy. For example, the SDEN controller cluster 1140 of some embodiments, updates a mapping between the endpoint's MAC address and an SD-WAN tenant ID associated with the received group ID. The SDEN controller cluster 1140 of some embodiments also updates an ACL and/or a QoS associated with the network policy.

At 1110, the SDEN controller cluster 1140 sends an access accept message to the SD-WAN edge appliance 1130 to notify that the endpoint's access request has been accepted. In some embodiments, the SDEN controller cluster 1140 also provides an ACL and/or QoS update to the SD-WAN edge appliance 1130. Lastly, at 1111, the SD-WAN edge appliance 1130 sends an EAPOL success message to the wired endpoint 1120. After this message has been sent, the wired endpoint 1120 is able to connect to the shared network fabric using the correct virtual network with which it is associated.

Figure 12:
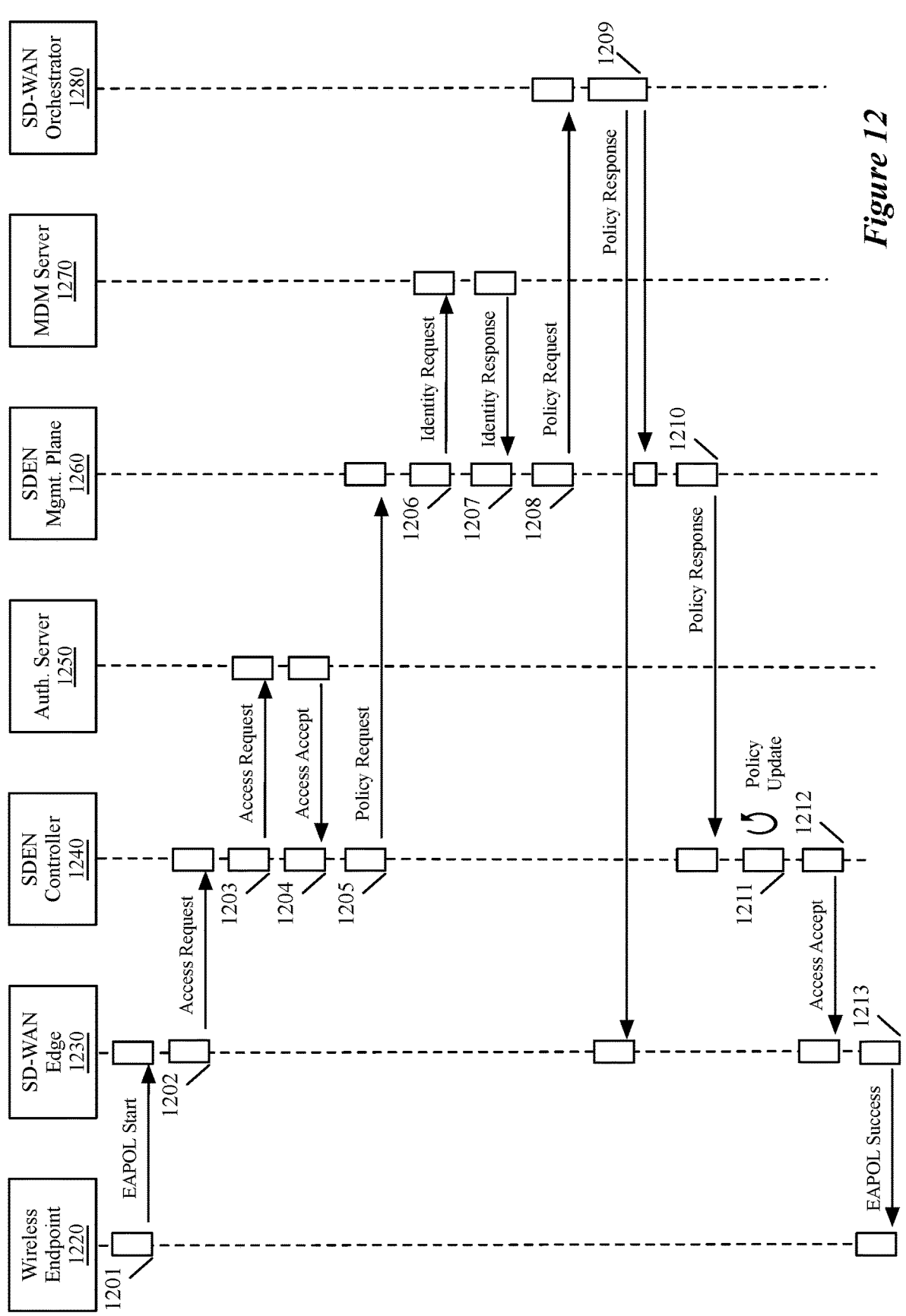
FIG. 12 illustrates communication for a remote site for wireless devices.

In some embodiments, wireless endpoints of a remote site connect to the shared network fabric differently than wired endpoints. FIG. 12 illustrates the communication between a wireless endpoint 1220, an SD-WAN edge appliance 1230, an SDEN controller cluster 1240, an authentication server 1250, an SDEN management plane 1260, an MDM server set 1270, and an SD-WAN orchestrator 1280 for connecting the wireless endpoint 1220 residing in a remote site to a shared network fabric.

At 1201, the wireless endpoint 1220 sends an EAPOL start request to the SD-WAN edge appliance 1230. The EAPOL start request is sent by the wireless endpoint 1220 when it wants to request access to the shared network fabric but does not know the MAC address of the authenticator (i.e., the authentication server 1250 in this example). After receiving the EAPOL start request, at 1202, the SD-WAN edge appliance 1230 provides an access request for the endpoint 1220 to the SDEN controller cluster 1240. In some embodiments, the SDEN controller cluster 1240 is a set of one or more controllers operating as the SDEN control plane at the same remote site as the wireless endpoint 1220. The access request in some embodiments includes a set of attributes related to the wireless endpoint 1220 and/or the user using the endpoint. For instance, the set of attributes can include a MAC address of the endpoint 1220 and a set of credentials (e.g., a username and password) for the user.

At 1203, the SDEN controller cluster 1240 sends an access request to the authentication server 1250. In some embodiments, the authentication server 1250 resides in a cloud site of the shared network fabric (such as the authentication server 1025 of FIG. 10). In other embodiments, it resides in the same remote site as the wireless endpoint 1220 and the SDEN controller cluster 1240. The access request of some embodiments includes the user's set of credentials for the authentication server 1250 to authenticate. In other embodiments, it also includes the endpoint's MAC address because the authentication server 1250 has to authenticate not only the user but the endpoint 1220 used by the user as well. Once the authentication server 1250 has authenticated the user/endpoint, at 1204, it sends an access accept message to the SDEN controller cluster 1240.

After receiving the access accept message, at 1205, the SDEN controller cluster 1240 sends a network policy request to the SDEN management plane 1260. The SDEN management plane 1260 of some embodiments resides in a cloud along with the authentication server 1250 (such as the SDEN management plane 1028 of FIG. 10). The policy request in some embodiments requests a policy related to the virtual network to which the wireless endpoint 1220 belongs. In some embodiments, the SDEN controller cluster 1240 includes the MAC address of the wireless endpoint 1220 in the policy request.

At 1206, the SDEN management plane 1260 sends an identity request to the MDM server set 1270. The MDM server set 1270 resides in the cloud along with the SDEN management plane 1260 and the authentication server 1250. In some embodiments, the identity request includes the MAC address of the wireless endpoint 1220 for the MDM server set 1270 to determine which group the endpoint belongs. In other embodiments, the identity request includes the user's credentials for the MDM server set 1270 to determine which group the user belongs. Still, in other embodiments, the identity request includes both the endpoint's MAC address and the user's credentials for the MDM server set 1270 to determine which group the user and the endpoint 1220 belong.

At 1207, the MDM server set 1270 provides an identity response to the SDEN management plane 1260. In some embodiments, the identity response includes a group ID specifying the user and/or endpoint's group. After receiving the identity response, at 1208, the SDEN management plane 1260 provides the policy request to the SD-WAN orchestrator 1280. The SD-WAN orchestrator 1280 of some embodiments resides in a cloud of the shared network fabric along with the SDEN management plane 1260. In some embodiments, the policy request sent at 1208 includes the group ID determined by the MDM server set 1270. At 1209, the SD-WAN orchestrator 1280 determines the network policy for the endpoint 1220 and provides a policy response to the SDEN management plane 1260 and the SD-WAN edge appliance 1230.

At 1210, the SDEN management plane 1260 provides the policy response to the SDEN controller cluster 1240. Using the received network policy, at 1211, the SDEN controller cluster 1240 updates the network policy. For example, the SDEN controller cluster 1240 of some embodiments, updates a mapping between the endpoint's MAC address and an SD-WAN tenant ID associated with the received group ID. The SDEN controller cluster 1240 of some embodiments also updates an ACL and/or a QoS associated with the network policy.

At 1212, the SDEN controller cluster 1240 sends an access accept message to the SD-WAN edge appliance 1230 to notify that the endpoint's access request has been accepted. In some embodiments, the SDEN controller cluster 1240 also provides an ACL and/or QoS update to the SD-WAN edge appliance 1230. Lastly, at 1213, the SD-WAN edge appliance 1230 sends an EAPOL success message to the wireless endpoint 1220. After this message has been sent, the wireless endpoint 1220 is able to connect to the shared network fabric using the correct virtual network with which it is associated.

As discussed previously, a site (e.g., a branch site, a remote site, etc.) of some embodiments, that implements multiple SD-WANs, connects to a cloud site using an edge appliance and an orchestration service facilitated by an SDN management plane in the cloud and an SDN control plane at the site. FIG. 13 conceptually illustrates a process 1300 of some embodiments for dynamically associating mobile devices with different SD-WANs on a shared network fabric of an entity. This process 1300 is performed in some embodiments by a set of SDEN servers implementing an SDEN control plane at a first site of the entity connected to a second site of the entity through the SD-WANs. The process 1300 is performed in some embodiments when the second site includes an orchestration service (e.g., a Velo-Cloud® orchestration service) to connect to the first site.

In some embodiments, at least two different SD-WANs are implemented for at least two different groups of the entity. These groups are in some embodiments different user groups of the entity. These groups in other embodiments are different device groups of the entity. The groups in other embodiments are a combination of user and device groups of the entity. The process 1300 will be described in relation to the components of FIG. 6, however one of ordinary skill will realize that different configurations of branch sites and cloud sites may be used.

The process 1300 begins by identifying (at 1305) a particular mobile device that needs to connect to an SD-WAN of the shared network fabric. In some embodiments, the SDEN control plane 616 receives, through the set of infrastructure switches 612 (e.g., through an MWN switch), a request from the particular mobile device (i.e., an endpoint 611) to connect to the entity's shared network fabric. This request includes at least one of a MAC address of the mobile device and a set of user credentials (e.g., a username and password) for the user of the mobile device.

Next, the process 1300 authenticates (at 1310) the particular mobile device. In some embodiments, the SDEN control plane 616 uses the authentication server 625 in the cloud 620 to authenticate the mobile device. In other embodiments, the SDEN control plane 616 uses a different authentication server operating in the branch site 610. The mobile device is authenticated in some embodiments based on its MAC address. For instance, the authentication server 625 can use the data store 626 to retrieve a policy associated with the MAC address to determine whether the device itself is allowed to access the shared network fabric.

In other embodiments, the authentication server 625 uses the user's authentication credentials to determine (e.g., based on a policy stored in the data store 626) whether the user is allowed to access the shared network fabric. Still, in other embodiments, the authentication server 625 uses both the MAC address and the user's authentication credentials to authenticate the mobile device. In some embodiments, authentication of the mobile device is not necessary, and the step 1310 is not performed.

At 1315, the process 1300 uses a set of one or more MDM servers to identify an MDM group with which the particular mobile device is associated. Using the MDM server set 627, the SDEN control plane 616 of some embodiments determines to which device group the mobile device belongs. In such embodiments, the SDEN control plane 616 provides the device's MAC address to the MDM server set 627 to determine the device group. A device group is in some embodiments defined based on the device type, such as a first group for laptops, a second group for smartphones, a third group for tablets, etc.

In other embodiments, the SDEN control plane 616 determines to which user group the user of the mobile device belongs. In such embodiments, the SDEN control plane 616 provides the user's credentials to the MDM server set 627 to determine the user group. The SDEN control plane 616 also provides the device's MAC address along with the user's credentials to identify the user group. In some embodiments, a user group is a group of members of the entity that share a set of characteristics. The set of characteristics in some embodiments include at least one of a shared responsibility for the entity, a shared role within the entity, and a shared subgroup of the entity.

After identifying the MDM group, the process 1300 uses (at 1320) the identified MDM group to identify a particular LAN at the first site for the particular mobile device to connect to network resources of the first site that are connected to the particular LAN. In some embodiments, the particular LAN includes the infrastructure switch set 612, the router 613, and the edge appliance 615 of the branch site 610. Using these components, the mobile device is able to connect to network resources within the branch site 610. In some embodiments, the network resources include one or more of servers (e.g., VMs, containers, Pods, etc.), applications, middlebox services (e.g., firewall services, network address translation services, load balancing services, etc.), and forwarding elements (e.g., routers, switches, etc.).

Lastly, the process 1300 uses (at 1325) the identified MDM group to identify a particular SD-WAN for the particular mobile device to use to connect to the second site to have access to a set of one or more network resources at the second site. In some embodiments, the SDEN control plane 616 uses the SDEN management plane 628 to connect the edge appliance 615 in the branch site 610 to the orchestration server 624 in the cloud 620 in order to connect the two sites. In such embodiments, the SDEN control plane 616 notifies the SDEN management plane 628 that the mobile device needs an SD-WAN connection to connect to the cloud 620, and the SDEN management plane 628 directs the orchestration service 624 to connect to the edge appliance 615. The particular LAN is in some embodiments a first logical network of several logical networks implemented at the branch site for several different groups of mobile devices. These logical networks are implemented in some embodiments to isolate data message flows between the different groups. After identifying the particular SD-WAN to connect the particular mobile device to the second site, the process 1300 ends.

In some embodiments, a first site (e.g., a branch site, a remote site, etc.), that implements multiple logical networks, connects to a second site using a connection between a TO router and an SDN edge node facilitated by an SDN management plane in the second site and an SDN control plane at the first site. FIG. 14 conceptually illustrates a process 1400 of some embodiments for dynamically associating mobile devices with different logical networks implemented on a shared network fabric of an entity. This process 1400 is performed in some embodiments by a set of SDEN servers implementing an SDEN control plane at a first site of the entity connected to a second site of the entity through the logical networks. In some embodiments, the first site is a branch site and the second site is a cloud site. In other embodiments, the first and second sites are both branch sites. Still, in other embodiments, the first site is a branch site and the second site is a datacenter site.

In some embodiments, at least two different logical networks are implemented for at least two different groups of the entity. These groups are in some embodiments different user groups of the entity. These groups in other embodiments are different device groups of the entity. The groups in other embodiments are a combination of user and device groups of the entity. The process 1400 will be described in relation to the components of FIG. 6, however one of ordinary skill will realize that different configurations of branch sites and cloud sites may be used.

The process 1400 begins by identifying (at 1405) a particular mobile device that needs to connect to a logical network of the shared network fabric of an entity. In some embodiments, the SDEN control plane 616 receives, through the set of infrastructure switches 612 (e.g., through an MWN switch), a request from the particular mobile device (i.e., an endpoint 611) to connect to the entity's shared network fabric. This request includes at least one of a MAC address of the mobile device and a set of user credentials (e.g., a username and password) for the user of the mobile device.

Next, the process 1400 authenticates (at 1410) the particular mobile device. In some embodiments, the SDEN control plane 616 uses the authentication server 625 in the cloud 620 to authenticate the mobile device. In other embodiments, the SDEN control plane 616 uses a different authentication server operating in the branch site 610. The mobile device is authenticated in some embodiments based on its MAC address. For instance, the authentication server 625 can use the data store 626 to retrieve a policy associated with the MAC address to determine whether the device itself is allowed to access the shared network fabric.

In other embodiments, the authentication server 625 uses the user's authentication credentials to determine (e.g., based on a policy stored in the data store 626) whether the user is allowed to access the shared network fabric. Still, in other embodiments, the authentication server 625 uses both the MAC address and the user's authentication credentials to authenticate the mobile device. In some embodiments, authentication of the mobile device is not necessary, and the step 1410 is not performed.

At 1415, the process 1400 uses a set of one or more MDM servers to identify an MDM group with which the particular mobile device is associated. Using the MDM server set 627, the SDEN control plane 616 of some embodiments determines to which device group the mobile device belongs. In such embodiments, the SDEN control plane 616 provides the device's MAC address to the MDM server set 627 to determine the device group. A device group is in some embodiments defined based on the device type, such as a first group for laptops, a second group for smartphones, a third group for tablets, etc.

In other embodiments, the SDEN control plane 616 determines to which user group the user of the mobile device belongs. In such embodiments, the SDEN control plane 616 provides the user's credentials to the MDM server set 627 to determine the user group. The SDEN control plane 616 also provides the device's MAC address along with the user's credentials to identify the user group. In some embodiments, a user group is a group of members of the entity that share a set of characteristics. The set of characteristics in some embodiments include at least one of a shared responsibility for the entity, a shared role within the entity, and a shared subgroup of the entity.

After identifying the MDM group, the process 1400 uses (at 1420) the identified MDM group to identify a first LNI associated with a first logical network that is defined over a shared network fabric at the first site for the particular mobile device to connect to network resources of the first site that are connected to the first logical network. In some embodiments, in identifying the MDM group, the SDEN control plane 616 receives from the MDM server set 627 an MDM group ID for the MDM group. In such embodiments, the SDEN control plane 616 uses the MDM group ID to identify the first LNI for the first logical network associated with that group.

In some embodiments, the identified first logical network includes the infrastructure switch set 612, router 613, and T0 router 614. Using these components, the mobile device is able to connect to network resources (e.g., using a secure connection or a tunnel) within the branch site 610. In some embodiments, the network resources include one or more of servers (e.g., VMs, containers, Pods, etc.), applications, middlebox services (e.g., firewall services, network address translation services, load balancing services, etc.), and forwarding elements (e.g., routers, switches, etc.).

At 1425, the process 1400 uses the identified MDM group to identify a second LNI associated with a second logical network connecting a first edge gateway at the first site to a second edge gateway at a second site of the entity. The second logical network identified by the second LNI in some embodiments (1) spans the first and second sites and (2) connects the mobile device at the first site to the set of network resources at the second site. In some embodiments, the first LNI is the same as the second LNI, as the first and second logical networks are one network. In other embodiments, the first LNI is different than the second LNI, as the first and second logical networks are two different logical networks with the first logical network being a logical LAN and the second logical network being a logical WAN. The logical LAN spans only the first site (i.e., the branch site 610), while the logical WAN spans at least the first and second sites (i.e., the branch site 610 and the cloud site 620).

This step 105 is in some embodiments facilitated by the SDEN control plane 616 using the SDEN management plane 628 and the SDN management plane 623. For example, the SDEN control plane 616 of some embodiments notifies the SDEN management plane 628 of the second logical network needed to connect the branch site 610 to the cloud site 620. The SDEN management plane 628 notifies the SDN management plane 623 that the mobile device needs logical network access to the cloud 620.

The SDN management plane 623 uses the SDN control plane 622 and the SDN edge node 621 to create the second logical network between the SDN edge node 621 and the T0 router 614 at the branch site 610. In some of these embodiments, the SDEN management plane 628 and the SDN management plane 623 are implemented as a single management plane in the cloud 620. In some embodiments, the second logical network connects the particular mobile device to a set of one or more network resources at the cloud site. Such network resources in some embodiments include servers, applications, middlebox services, and forwarding elements in the cloud 620. Because data message flows associated with the mobile device are routed between the T0 router 614 and the SDN edge node 621, the mobile device can be seen as in the same overlay network as the network resources in the cloud 620.

Lastly, the process 1400 inserts (at 1430) the second LNI in an encapsulation header that encapsulates data messages sent from the particular mobile device to a set of one or more network resources at the second site. In some embodiments, the encapsulation header is a tunnel header used to send the data messages from the first edge gateway (i.e., the T0 router 614) to the second edge gateway (i.e., the SDN edge node 621) through a tunnel established between the first and second edge gateways. This tunnel connects the first and second sites so that the mobile device is able to access the set of network resources at the second site. Because the data messages sent from the mobile device are sent using a secure connection (i.e., a tunnel), the mobile device can be seen as in the same overlay network as the set of network resources in the second site.

In some embodiments, the second LNI is inserted into the encapsulating header by the T0 router 614 operating at the branch site 610 to forward the encapsulated data messages to the SDN edge node 621 at the cloud site 620. In some embodiments, this encapsulation header is a first tunnel header and the data messages sent to the second site are a first set of data messages. In such embodiments, the process 1400 also inserts the first LNI in a second encapsulation header that encapsulates a second set of data messages sent from the mobile device to the network resources of the first site. The second encapsulation header is also a tunnel header used to send the second set of data messages through a tunnel or a secure connection in some embodiments. After inserting the second LNI to send data messages from the mobile device to the network resources at the second site, the process 1400 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
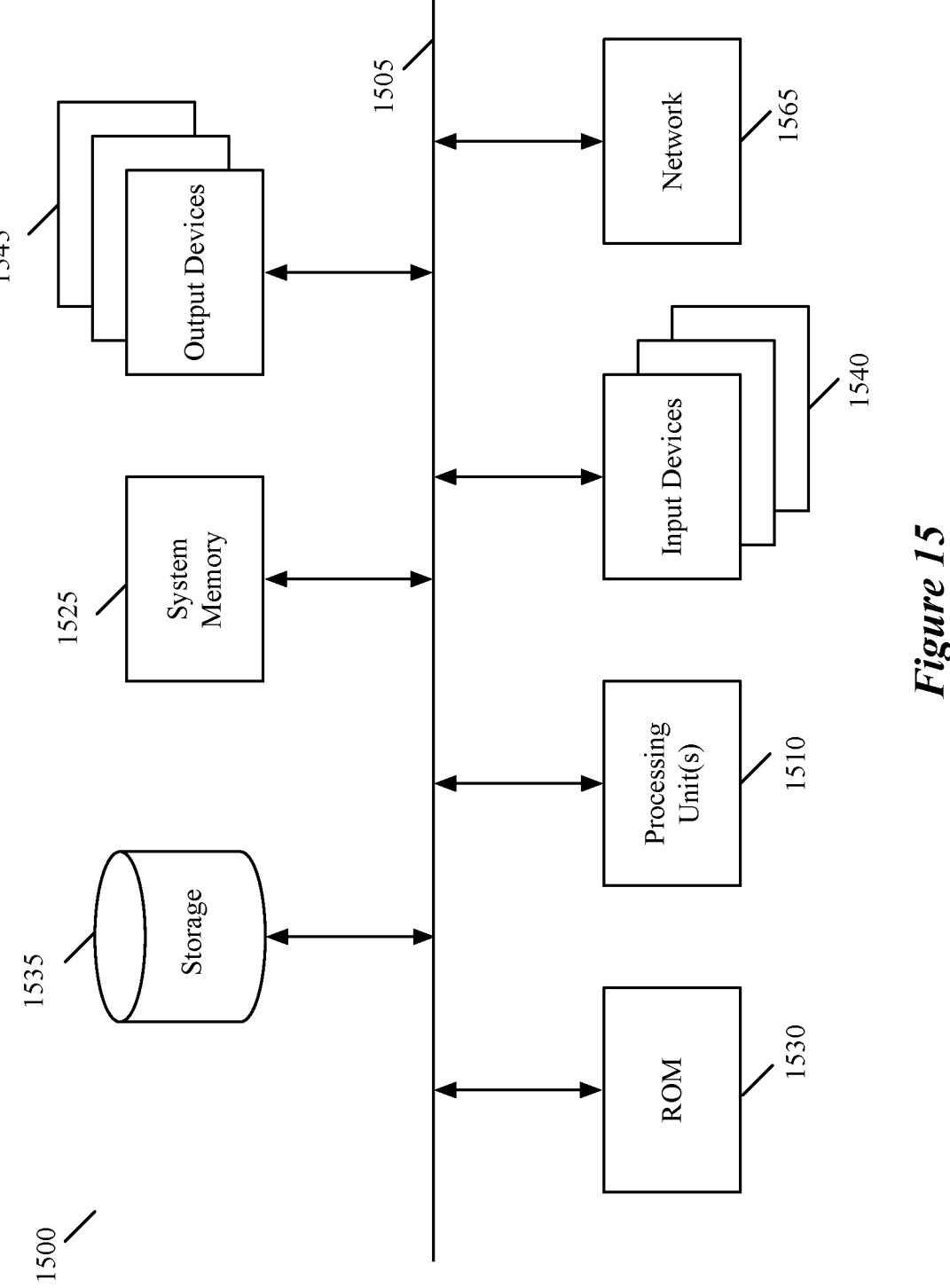
FIG. 15 conceptually illustrates an electronic system with which some embodiments of the invention are implemented.

FIG. 15 conceptually illustrates a computer system 1500 with which some embodiments of the invention are implemented. The computer system 1500 can be used to implement any of the above-described computers and servers. As such, it can be used to execute any of the above described processes. This computer system includes various types of non-transitory machine readable media and interfaces for various other types of machine readable media. Computer system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the computer system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments. The read-only-memory (ROM) 1530 stores static data and instructions that are needed by the processing unit(s) 1510 and other modules of the computer system. The permanent storage device 1535, on the other hand, is a read-and-write memory device. This device is a non-volatile memory unit that stores instructions and data even when the computer system 1500 is off. Some embodiments of the invention use a mass-storage device (such as a magnetic or optical disk and its corresponding disk drive) as the permanent storage device 1535.

Other embodiments use a removable storage device (such as a flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the computer system. The input devices 1540 include alphanumeric keyboards and pointing devices (also called "cursor control devices"). The output devices 1545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples computer system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of computer system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to micropro-cessor or multi-core processors that execute software, some embodiments are performed by one or more integrated circuits, such as application specific integrated circuits (ASICs) or field programmable gate arrays (FPGAs). In some embodiments, such integrated circuits execute instruc-tions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 7, 8, and 11-14) conceptually illustrate processes. The specific operations of these processes may not be performed in the exact order shown and described. The specific operations may not be performed in one continuous series of operations, and different specific operations may be performed in different embodiments. Furthermore, the pro-cess could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for dynamically associating mobile devices with different logical networks implemented on a shared network fabric of an entity, wherein at least two different logical networks are implemented for at least two different groups of the entity, the method comprising:

at a first site of the entity:

authenticating a particular mobile device;

using one or more mobile device management (MDM) servers to identify an MDM group with which the particular mobile device is associated, wherein using the one or more MDM servers to identify the MDM group comprises providing a media access control (MAC) address of the particular mobile device to the one or more MDM servers to identify a device group to which the particular mobile device belongs;

using the identified MDM group to identify a first logical network that is defined over the shared net-work fabric at the first site for the particular mobile device to connect to network resources of the first site that are connected to the first logical network;

using the identified MDM group to identify a logical network identifier (LNI) associated with a second logical network connecting a first edge gateway at the first site to a second edge gateway at a second site of the entity; and inserting the LNI in an encapsulation header that encapsulates data messages sent from the particular mobile device to one or more network resources at the second site.

2. The method of claim 1, wherein the encapsulation header is a tunnel encapsulation header that is used to send the data messages from the first edge gateway to the second edge gateway through a tunnel established between the first and second edge gateways.

3. The method of claim 1, wherein the first logical network has an associated LNI and the first logical network LNI is the same as the second logical network LNI, as the first and second logical networks are one network.

4. The method of claim 1, wherein the first logical network has an associated LNI and the first logical network LNI is different than the second logical network LNI, as the first and second logical networks are two different logical networks with the first logical network being a logical local area network (LAN) and the second logical network being a logical wide area network (WAN).

5. The method of claim 4, wherein the encapsulation header is a first encapsulation header and the data messages are a first set of data messages, the method further compris-ing inserting the first logical network LNI in a second encapsulation header that encapsulates a second set of data messages sent from the particular mobile device to the network resources of the first site.

6. The method of claim 4, wherein using the one or more MDM servers to identify the MDM group further comprises receiving an MDM group identifier (ID) for the MDM group from the one or more MDM servers.

7. The method of claim 6, wherein:

using the identified MDM group to identify the first logical network comprises determining that the MDM group ID is associated with the first logical network LNI, and using the identified MDM group to identify the second logical network LNI associated with the second logical network comprises determining that the MDM group ID is associated with the second logical network LNI.

8. The method of claim 1, wherein authenticating the particular mobile device comprises:

receiving a set of authentication credentials from the particular mobile device; and using the set of authentication credentials to authenticate the particular mobile device.

9. The method of claim 8, wherein the set of authentication credentials comprises a username and password of a user of the particular mobile device.

10. The method of claim 8, wherein authenticating the particular mobile device comprises directing an authentication server operating at the first site to authenticate the particular mobile device.

11. The method of claim 8, wherein authenticating the particular mobile device comprises providing the set of authentication credentials to an authentication server operating at the second site to authenticate the particular mobile device.

12. The method of claim 1, wherein the network resources of the first site and the one or more network resources at the second site each comprise one or more of servers, applications, middlebox services, and forwarding elements.

13. The method of claim 1, wherein the at least two different groups of the entity comprise different user groups of the entity.

14. The method of claim 1, wherein the at least two different groups of the entity comprise different device groups of the entity.

15. The method of claim 1, wherein the device group comprises devices of a same type.

16. The method of claim 15, wherein the same type is one of a laptop, smartphone, or tablet.

17. The method of claim 1, wherein using the one or more MDM servers to identify the MDM group further comprises providing a set of authentication credentials associated with a user of the particular mobile device to the one or more MDM servers to identify a user group to which the user belongs.

18. The method of claim 1, wherein the first site is a branch site of the entity and the second site is a cloud site of the entity.

19. A non-transitory machine readable medium storing a program for execution by at least one processing unit for dynamically associating mobile devices with different logical networks implemented on a shared network fabric of an entity, wherein at least two different logical networks are implemented for at least two different groups of the entity, the program comprising sets of instructions for:

at a first site of the entity:

authenticating a particular mobile device;

using one or more mobile device management (MDM) servers to identify an MDM group with which the particular mobile device is associated, using the one or more MDM servers to identify the MDM group comprising providing a media access control (MAC) address of the particular mobile device to the one or more MDM servers to identify a device group to which the particular mobile device belongs;

using the identified MDM group to identify a first logical network that is defined over the shared network fabric at the first site for the particular mobile device to connect to network resources of the first site that are connected to the first logical network;

using the identified MDM group to identify a logical network identifier (LNI) associated with a second logical network connecting a first edge gateway at the first site to a second edge gateway at a second site of the entity; and inserting the LNI in an encapsulation header that encapsulates data messages sent from the particular mobile device to one or more network resources at the second site.

20. The non-transitory machine readable medium of claim 19, wherein the encapsulation header is a tunnel encapsulation header that is used to send the data messages from the first edge gateway to the second edge gateway through a tunnel established between the first and second edge gateways.

\*    \*    \*    \*    \*